United States Patent [19]
Barnes et al.

[11] Patent Number: 6,122,052
[45] Date of Patent: Sep. 19, 2000

[54] COMPUTER OPERATED SPECTROMETRIC INSTRUMENT AND ASSOCIATED CALCULATOR

[75] Inventors: Robert F. Barnes, Shelton; Mario Carozza, Danbury; David J. Eaton, Newtown; Gerard T. Paul, Westport; J. Fenton Williams, Brookfield; Mark W. Stoltze, New Canaan; Steven L. Paul, Ridgefield; Andrew P. Bajorinas, Stamford, all of Conn.

[73] Assignee: Perkin Elmer LLC, Norwalk, Conn.

[21] Appl. No.: 09/300,609

[22] Filed: Apr. 27, 1999

Related U.S. Application Data

[60] Provisional application No. 60/083,332, Apr. 27, 1998, and provisional application No. 60/085,767, May 16, 1998.

[51] Int. Cl.$^7$ .................................. G01J 3/02; G01J 3/18
[52] U.S. Cl. ........................................................... 356/328
[58] Field of Search ................................... 356/319, 323, 356/325, 326, 328

[56] References Cited

U.S. PATENT DOCUMENTS 4,241,998  12/1980  Farkas et al. ........................... 356/319
4,692,883  9/1987  Nelson et al. ........................... 356/319

*Primary Examiner*—F. L. Evans
*Attorney, Agent, or Firm*—St. Onge Steward Johnston & Reens LLC

[57] ABSTRACT

A spectrometric instrument passes flashing light through a sample and has a linear detector operated by the computer to integrate signals for an established number of flashes to obtain an integrated unit of the signal data, from which spectral information is displayed on a monitor. Over a full spectral range, the established number is determined as that which effects a highest peak height proximately below a preselected maximum, and light source voltage is adjusted to bring the peak height closer to the maximum. For a narrower spectral range, an operating number of flashes for a unit is increased above the established number to accommodate a lower highest peak in the range. Wavelength calibration uses peaks in the light source. Corrections are made for stray light and non-linearity of detector response. Calculation of auxiliary information derived from input of auxiliary data through a touch screen is displayed on the monitor.

30 Claims, 31 Drawing Sheets

PCR MASTER MIX CALCULATOR

| REACTIONS | REAGENTS | dNTP'S |

NUMBER OF REACTIONS: 96

% PIPETTING EXCESS: 10 %

TOTAL REACTION VOLUME: 100 μL

SAMPLE VOLUME: 10 μL

HELP   DONE

DISPSIM

FIG. 19a

PCR MASTER MIX CALCULATOR

| REACTIONS | REAGENTS | dNTP'S |
|---|---|---|

|  | STOCK |  | FINAL |  | μL/RXN | TOTAL μL |
|---|---|---|---|---|---|---|
| PCR BUFFER: | 10 | x | 1 |  | 10 | 1.06e+3 |
| dNTP MIX: | 5 | mM | 0.8 |  | 16 | 1.69e+3 |
| P1: | 20 | μM | 1 |  | 5 | 528 |
| P2: | 20 | μM | 1 |  | 5 | 528 |
| TAQ: | 5 | U$\mu$L | 0.025 |  | 0.5 | 52.8 |
| Mg$^{++}$: | 20 | mM | 1.5 |  | 6 | 634 |
| WATER: |  |  |  |  | 47.5 | 5.02e+3 |
| MASTER MIX: |  |  |  |  | 90 | 9.50e+3 |

HELP　　DONE

FIG. 19b

PCR MASTER MIX CALCULATOR

| REACTIONS | REAGENTS | dNTP'S | dNTP MIX ( 5% EXCESS ): 1.77e+3 μL

| | STOCK | | FINAL | | TOTAL μL |
|---|---|---|---|---|---|
| dATP: | 10 | mM | 1.25 | | 222 |
| dCTP: | 10 | mM | 1.25 | | 222 |
| dGTP: | 10 | mM | 1.25 | | 222 |
| dTTP: | 10 | mM | 1.25 | | 222 |
| WATER: | | | | | 887 |

[HELP] [DONE]

COMPUTER OPERATED SPECTROMETRIC INSTRUMENT AND ASSOCIATED CALCULATOR

This is application claims priority from U.S. Provisional Patent Applications 60/083,332 filed on Apr. 27, 1998 and 60/085,767 filed on May 16, 1998.

This invention relates to spectrometric instruments, particularly to spectrometric instruments of the type having light absorption by samples, particularly with a flash lamp source, and more particularly to computer operated spectrometric instruments.

BACKGROUND

Spectrometric instruments include a light source, a test sample, a dispersion element such as a diffraction grating, a detector that may be a linear array of diode receptors (pixels), and appropriate connecting optics. Modern instruments include a computer that receives spectral signals from the detector to process the signals. In one type of instrument, the light is passed through the sample so that a transmitted beam is detected. One type of light source is a flash lamp, and the sample may be dissolved or suspended in a cuvette of carrier liquid.

With improvements in optics, detectors and computerization, there has evolved an ability to perform very precise measurements. However this has resulted in fairly expensive instruments and complex operations. There is a need for both lower cost instruments and simplicity of operation, particularly with sufficient automation for an operator to do little more than select type of sample, insert the sample and start the instrument. In the case of a sample in a carrier, an added step for a blank (carrier without sample) may be desired. Such instruments are desirable currently in molecular biology such as for determining concentrations of proteins and nucleic acids including RNA and DNA.

Lower cost components are subject to fluctuations in performance between instruments and drift in each instrument. Therefore, the automation should provide for frequently checking and resetting operating point associated with the flash lamp and detector readouts, further resetting for narrower spectral range if automatically selected for a sample type, correcting for stray light and non-linearity, and wavelength calibration.

An object of the invention is to provide an improved spectrometric instrument having relatively low cost and simplicity of operation. Another object is to provide such an instrument with means for automatically checking and resetting operating point to optimize performance, repeatability and drift correction. A further object is to provide such an instrument with means for resetting operating point for narrower spectral range. Other objects are to provide such an instrument with means to correct for stray light and non-linearity, and to calibrate for wavelength. An additional object is to provide such an instrument with means for calculation of auxiliary information associated with the sample and derived from input of auxiliary data through a touch screen.

SUMMARY

The foregoing and other objects are achieved, at least in part, in a spectrometric instrument that includes a flashing type of light source for emitting a flashing source beam of light, operating means for flashing the light source, a receptacle for a light-absorbing sample receptive of the source beam to pass a transmitted beam, a dispersing element receptive of the transmitted beam to effect dispersed light therefrom, a detector receptive of the dispersed light for generating corresponding signal data representative of the transmitted beam, and a computer receptive of the signal data for effecting corresponding spectral data representative of the transmitted beam and thereby a sample in the receptacle. The detector is operated by the computer to integrate signals for an established number of flashes to obtain an integrated unit of the signal data.

In a preferred aspect, the light source is flashed for a preselected total number of flashes equal to a multiple of the established number. The detector effects a corresponding multiplicity of integrated units of signal data. The multiplicity of units of signal data are added to obtain the spectral data. Preferably the flash total is held constant for successive operations of the instrument even with variations in the established number.

To determine the established number of flashes, the instrument is operated with a preliminary light source voltage, and with a preliminary number as the established number, and preferably without a sample, so as to generate preliminary spectral data. A highest peak in the preliminary spectral data and an associated preliminary peak height are ascertained. The preliminary peak height is compared with a preselected maximum peak height to determine an adjusted number of flashes required to obtain a unit of signal data and corresponding spectral data with a corresponding peak height for the highest peak. The corresponding peak height is equal to or proximately below the maximum peak height. The adjusted number is stored for use as the established number of flashes in an integrated unit for subsequent operation of the instrument.

The operating means drives the light source with a source voltage such that the light source has an intensity with a dependence on the source voltage. The voltage, which is pulsed to flash the lamp, is adjusted to bring the spectral peak height closer to the maximum. To do this in a preferred embodiment, the instrument is operated without a sample and with the adjusted number as the established number of flashes, the operating being firstly with a first source voltage so as to generate corresponding spectral data with a first peak height for the same highest peak, and secondly with a second source voltage so as to generate corresponding spectral data with a second peak height for the highest peak. A functional dependence (generally linear) is determined between source voltage and peak height by utilizing the first and second source voltage and the first and second peak height. From this dependence an operational voltage is determined, being that required to effect an associated peak height at the associated spectral position, such that the associated peak height is equal to or adjacently below the maximum peak height. The operational source voltage is set for driving the light source for subsequent operation of the instrument.

In a further aspect ("zoom"), the adjusted number of flashes is determined from spectral data for a full spectral range, but a narrower spectral range within the full spectral range is utilized for a selected sample. The instrument is operated with the sample and with the adjusted number as the established number of flashes. Corresponding spectral data are obtained in the narrower spectral range. A highest peak in this spectral data and a corresponding preliminary peak height are ascertained. An integer ratio is computed that approximates an actual ratio of the preselected maximum peak height to the preliminary peak height. The adjusted number is multiplied by the integer ratio to determine an operating number for the established number of flashes. The instrument then is operated with the selected sample and the operating number as the established number of flashes. Preliminary spectral data are obtained for the selected sample in the narrower spectral range with the operating number of flashes. The preliminary spectral data are divided by the integral ratio to generate sample spectral data representative of the selected sample.

In another aspect, the instrument is calibrated for wavelength using the light source in which the source beam comprises a plurality of spectral peaks having predetermined spectral positions. The instrument is operated to obtain corresponding spectral data including measured spectral positions of the spectral peaks, and the measured spectral positions are calibrated against the predetermined spectral positions.

Yet another aspect corrects for non-linearity of response. The instrument is operated repetitively with a dark sample that passes a transmitted beam of low intensity compared to the source beam so as to obtain a series of integrated units of dark spectral data, the series being for a number set of a multiplicity of numbers of flashes. A sequence of dark spectral data are obtained over the number set for each of preselected spectral positions. A master function representative of the sequence over the number set is computed for all of the preselected spectral positions. The master function is stored and later applied as a correction factor to measured spectral data to correct for non-linearity. In an advantageous way to determine the master function, ratios of the sequenced dark spectral data to corresponding number of flashes are computed and fitted against number of flashes to a position function for each preselected position. A set of high points and a value for each such high point in each position function are ascertained including a highest point for an associated highest position function. The high points are utilized to normalize the position functions to the highest position function so as to create a set normalized functions. The normalized functions are averaged to create the master function.

In an aspect for correcting for stray light, the instrument further comprises operating means for operating the instrument without a sample to generate open beam measured spectral data, and with a standard sample to generate standard measured spectral data. The standard sample has a high absorbance in a selected spectral range, with the spectral data being acquired over a selected number of spectral increments in this range. The measured spectral data is divided by the number of spectral increments to respectively effect open beam reduced spectral data and standard reduced spectral data. A stray light correction value is subtracted from the reduced spectral data to respectively effect open beam corrected spectral data and standard corrected spectral data. A corrected standard absorbance is computed from the corrected spectral data, and the stray light correction value is iteratively determined such that the corrected standard absorbance substantially equals a pre-established standard absorbance. In a preferred aspect for the iteration, the standard reduced spectral data are integrated and normalized to effect an average, and a factor is iteratively determined such that the stray light correction value is a multiplication product of the average and the factor. The stray light correction value is subtracted from subsequently generated spectral data to correct for stray light.

In a further embodiment, a monitor is provided for display of the spectral information, and a touch screen is overlayed on the monitor. Calculation of auxiliary information associated with the sample is derived from input of auxiliary data through the touch screen, and the auxiliary information is displayed on the monitor. In one aspect the auxiliary information may be further derived from the spectral data, and for another aspect it is not further derived from the spectral data.

BRIEF DESCRIPTION OF THE DRAWINGS

FIGS. 13–15, 16a, 16b, 17, 18, 19a–19c, 20–24, 25a–25c and 26 are examples of displays and auxiliary operations related to microbiology.

DETAILED DESCRIPTION

Figure 1:
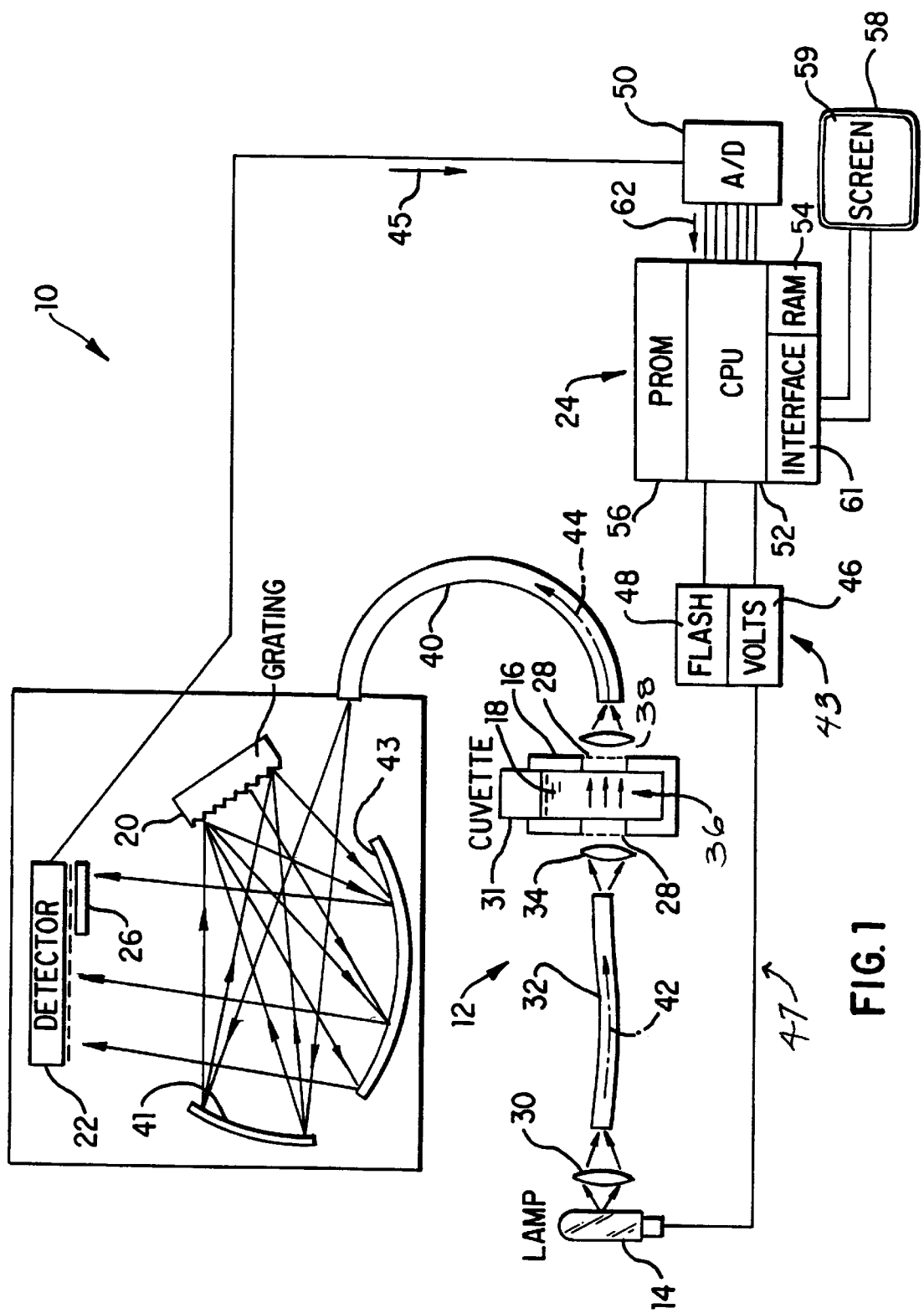
FIG. 1 is a schematic drawing of a spectrometric instrument of the invention.

A spectrometric instrument 10 of the invention (FIG. 1) has an optical section 12 that includes a light source 14, a receptacle 16 for a light-absorbing sample 18, a dispersion element 20 (preferably a grating), a detector 22 and appropriate mirrors and lenses. The instrument utilizes a computer 24. Several filters are desirable, namely an optical filter 26 in part of the spectrum at the detector, and a screen 28 at each of the input and output of the receptacle to reduce total light through the system. For preferred embodiments, the light source is a flash lamp.

Advantageously the light path from the source to the receptacle, and thence to the grating optics, is effected with a pair of optical fibers. A collecting lens 30 focuses the lamp on the input end of the adjacent first fiber 32, a collimating lens 34 is located at the input to the receptacle to effect a widened parallel beam 36 through a sample, and another collecting lens 38 is focused on the input end of the second fiber 40. Light from the end of this fiber is focused to the grating 20 by a concave mirror 41 and from the grating to the detector 22 by another concave mirror 43.

The receptacle 16 for a sample 18 may be any conventional type, preferably a holder for a cuvette 31, e.g. 1 cm square. If no cover is used for the holder, the inside should be black, the cuvette a relatively close fit, and the beam low enough into the holder to minimize extraneous radiation.

Thus the source lamp 14 emits a source beam 42 of light directed to the receptacle 16 which passes a transmitted beam 44 to the grating 20 which, in turn, dispurses a spectrum to the detector 22. The detector effects corresponding signal data representing the transmitted beam and thereby the sample. A lamp unit module 47 includes the lamp 14 and a lamp controller 43 that provides a lamp voltage supply 46 and a flash trigger 48. The controller is supplied with power (not shown) such as 12 volts.

Advantageously, all components (including computer components described below) are contained in a single box. With the data processing and controls described herein, it is not necessary for the optical components to be of high precision, except for consistency of the light source and detector during an operation.

The computer 24 includes an analog/digital (A/D) interface 50 with the detector 22 for receiving the signal data and controlling its downloading. The computer further includes a processing unit (CPU) 52 with a Motorola 68332 that functions both as a data processor and a controller for the instrument, and random access memory (RAM) 54. The processor and controller thus are operatively connected in the computer. The computer includes a clock for timing detector readouts in association with lamp flashing. Programming for the computer may be in the form of software but advantageously is imbedded as firmware in a programmable read-only memory device (PROM) 56 such as a XILINX. Also permanent information is stored in this. A screen 58 displays spectral and operating information. Operator input may be achieved with a keyboard, but a touch screen 59 is particularly convenient. A printer port may be provided. The computer programming is conventional such as with C++ and Assembly language. Adaptations of the programming for the present invention from flow charts and descriptions herein will readily be recognized and achieved by those skilled in the art. The flow charts represent means and steps for carrying out various aspects of the invention. Details of the computer and the programming are not important to the invention, and any conventional or other desired computer and programming components that would serve the purposes described herein should be deemed equivalent.

The full spectral range for the spectrometer-detector arrangement in the present example is from near infrared (IR) to near ultraviolet (UV), generally between about 220 and 760 nm wavelength, although some spectra may be processed in a narrower range. The preferred detector is formed as a linear array, from which spectral positions may be expressed in pixel units (corresponding to spectral increments) for computational purposes, and displayed as wavelength when appropriate.

The flash lamp controller is connected between the CPU and the light source. The controller aspect of the computer and the lamp controller together constitute a control means for controlling both the lamp and the detector. The voltage supply and flash control generally are integral to the lamp unit and are and adapted to drive the selected light source.

A preferred light source 14 is a xenon flash lamp such as an EG&G model FX-1102. The lamp envelope should be high purity quartz or other UV transparent glass to pass the UV end of the desired spectral range. With its associated controller, the lamp generates light pulses at nominally at 120 hZ, the pulses being 35 milliJoules and substantially square. The lamp voltage from its source 46 is variable, the flash pulse height being proportional to this voltage and therefore controllable. The trigger 48 flashes the lamp for a selected series of pulses. It is desirable to operate the instrument each time with the same total number of flashes, for example 120 flashes, for each acquisition of spectral data. Alternatively, the lamp may be operated longer, even almost continuously, with the computer processor acting to limit the processing of data signals received only during such a selected number of flashes. However, for reasons including lamp life, it is advantageous to limit the flashing. Thus, it is desirable that lamp operation be instantaneous with no warmup time required.

The grating 20 is conventional. Although a grating is preferable, another type of dispersion element such as a prism may be used.

The filter 26 is used for order sorting and leveling a strong portion of the spectrum. Some second order spectrum of 200 to 400 nm was found to reach the detector in the first order region of 400 to 800 nm. Constructed with film technology, the filter blocks the 200 to 400 nm wavelengths in this 400–800 nm pixel region of the the detector.

The filter is placed over the detector between the 400 nm and 560 nm positions, to block second order components of the spectrum and attenuate this portion of the spectrum to 35% transmission. The filter makes it possible to pass about three times as much energy in the UV range without saturating the system.

The detector 22 is a conventional or other desired linear detector, advantageously a charge coupled device (CCD), for example an Ocean Optics Inc, Dunedin, Fla., type S2000. Such a detector has a linear array of light sensitive diodes 23 (pixels) having a nominal spectral resolution of 0.34 nm per pixel, with a total of 2048 pixels disposed in the light spectrum over the desired spectral range. Such a detector includes device structures associated with the diodes so that energy is accumulated at each pixel until a readout is commanded by the computer control. The energy is accumulated for an emission of one or more flashes. Thus input radiation is integrated for a selected or established number of one or more lamp flashes. Other types of detectors that achieve such function may be suitable, such as a charge injection device (CID).

The detector 22 is operatively connected to the CPU 52 through a conventional or other desired A/D device 50 which is, for example, a MAXIM 12 bit serial device A/D converter type MAX176, which converts to digital the analog spectral signals generated by the detector. The A/D feeds the digital spectral signals 62 to the CPU in the form of counts which are convenient units for representing spectral transmission in computations. The spectral data (spectrum; also termed transmission data) corresponds to total energy received by a pixel during one integration period for an established number of flashes. The A/D feeds through data from one pixel at a time. The 12 bit A/D fills (saturates) at 4096 counts which determines maximum height of a spectral peak in a pixel during data acquisition. Although the detector alternatively may determine the saturation limit, preferably the A/D determines the limit because it is the same across the spectral range. The A/D also conveys addressing instructions from the CPU control to the detector for the integration over the established number of lamp flashes in coordination with the lamp operation.

As indicated above, the light source 14 is flashed for a preselected total number of flashes ("flash total"), e.g. 120 flashes, or alternatively, the computer processes data for a period of the flash total although actual longer flash duration may be longer. This total is equal to a multiple of the established number of flashes utilized for each unit of integration by the detector. Thus the detector normally is addressed to effect a corresponding multiplicity of integrated units of signal data. The processor adds the multiplicity of units of signal data to effect spectral data. The established number per unit is ascertained as that which will provide integration units within the saturation limit. Such limit may be the limit of the detector or the A/D. In the present example, the limit is assumed to be in the A/D having maximum of 4096 counts for each unit.

The signal data from the detector represents energy of transmission. This may be an open beam energy transmission $E_O$ (flashing lamp, no sample), sample transmission $E_S$ (flashing lamp), or blank transmission $E_B$ (flashing lamp) for a blank which is a cuvette or other sample container with solvent or other carrier but without actual sample material. Alternatively a "blank" can be a standard sample for comparison. A dark transmission, representing background radiation and electronic noise acquired without the lamp emitting is subtracted first from the raw transmission data, and corrections for stray light and non-linearity explained below are made to effect the foregoing transmission data $E_O$, $E_S$ and $E_B$.

The processor conventionally converts transmittance ($E_S/E_O$ or $E_B/E_O$) to absorbance of the sample $A_S$ or a blank $A_B$. Final, relative absorbance values $A_F$ for a sample are then computed:

$$A_S = \text{smooth}(\log_{10}(E_O/E_S)) \quad \text{Eq. 1}$$

$$A_B = \text{smooth}(\log_{10}(E_O/E_B)) \quad \text{Eq. 2}$$

$$A_F = A_S - A_B \quad \text{Eq. 3}$$

where "$\log_{10}$" is logarithm base 10, and "smooth" is a smoothing of data by a conventional method such as sliding box car using nine (or other) point averaging for each datum point, or a Savitsky-Golay smoothing algoritm using a selected number such as 19 points.

Figure 2:
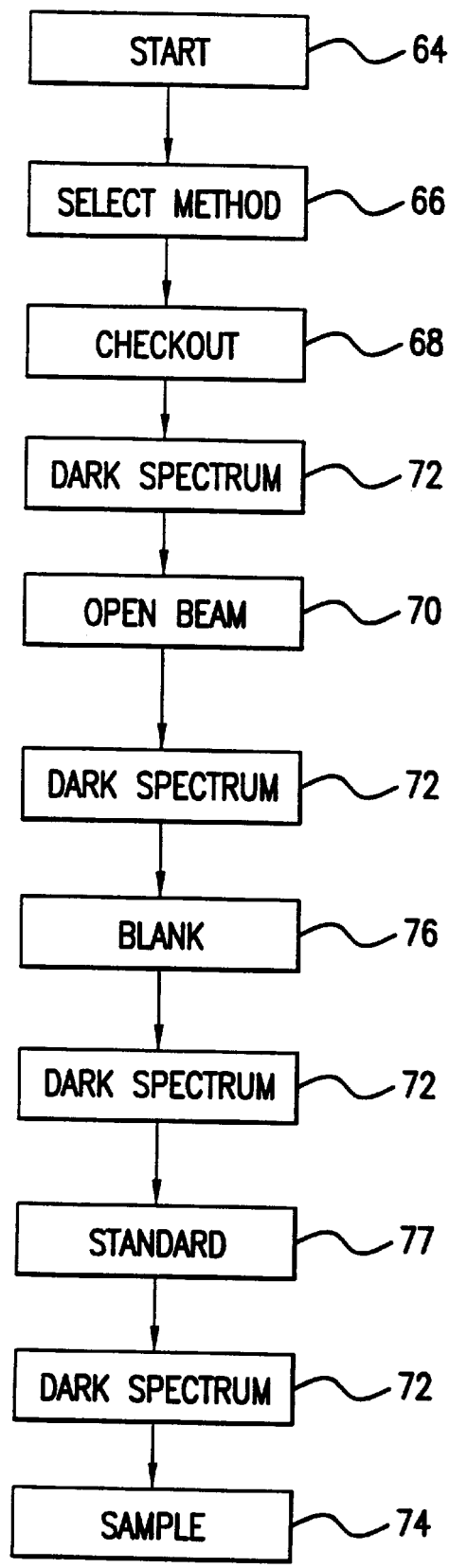
FIG. 2 is a flow chart for general operational sequence of the instrument of FIG. 1.
Figure 3:
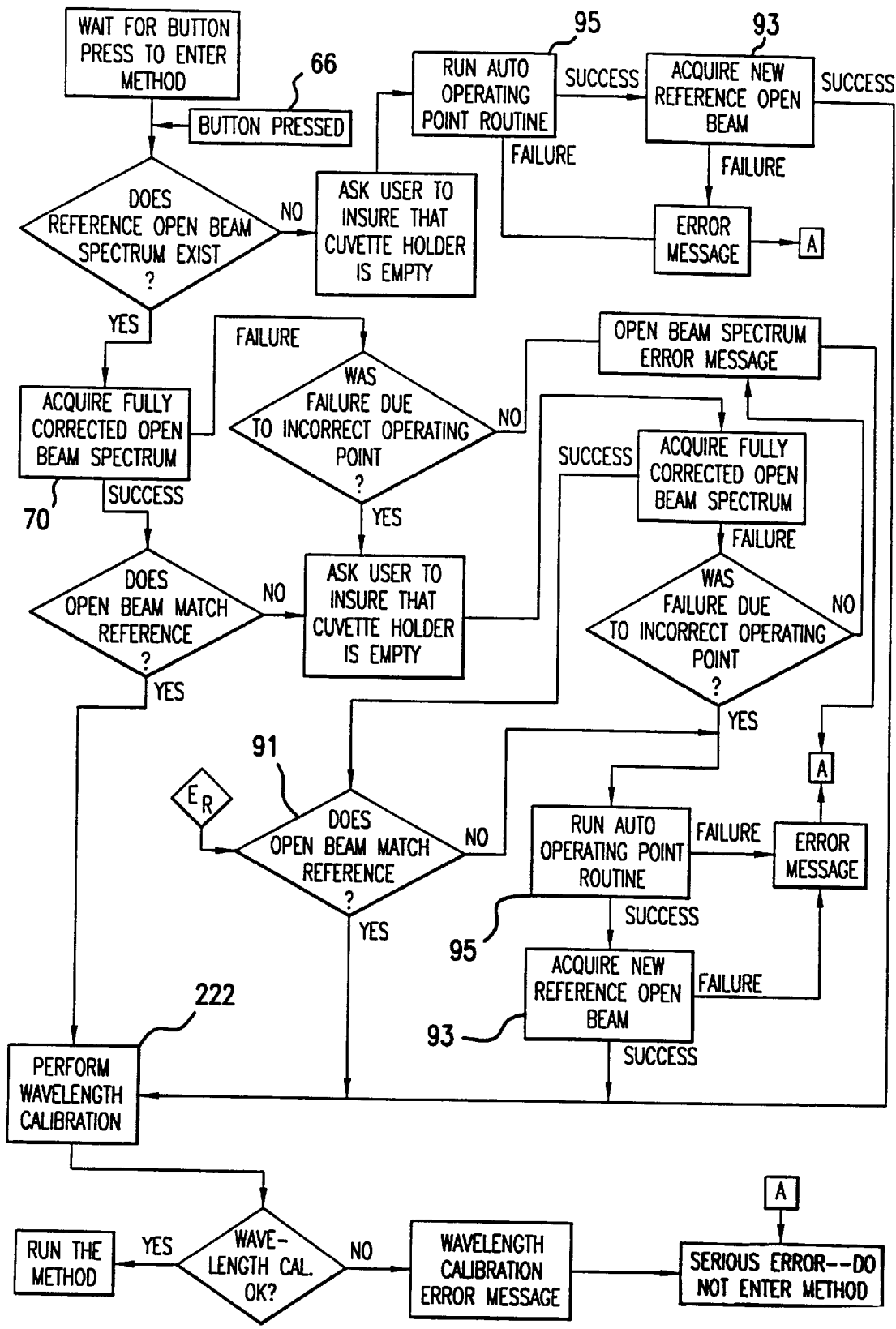
FIG. 3 is a flow chart for open beam operation and processing with the instrument of FIG. 1.

A spectrometric instrument of the present invention advantageously is configured for essentially full automation except for manual insertion of a sample and operator selection of method and type of sample material. When operations are started 64 (FIG. 2), an operator selects a method 66 on the touch screen, the computer automatically checks out several items 68 as shown in FIG. 3 in which most items including checkout tests (also in other figures) are self explanatory. An open beam operation 70 is run to acquire baseline data for operating point and to perform a wavelength calibration. Just before (or just after) this, and preferably with most other data acquisitions, a dark (background) spectrum is collected 72. Also, before an actual sample run 74, a blank spectrum of spectral data are obtained 76 with a sample support medium without sample, and are also obtained 77 with a standard sample.

Figure 4:
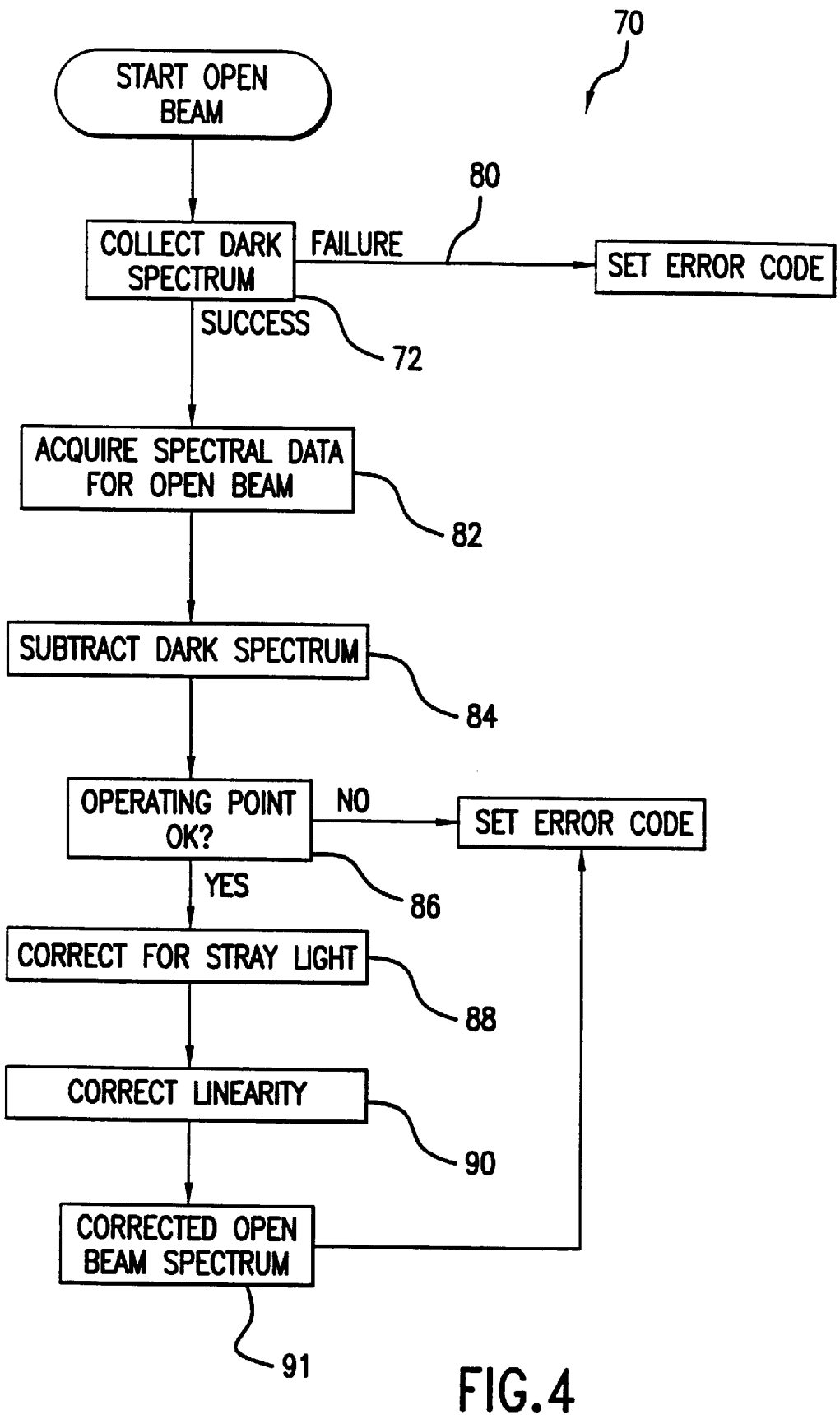
FIG. 4 is a flow chart for details of FIG. 3.

Procedures for acquiring a fully corrected open beam spectrum 70 are shown in FIG. 4. Dark spectral data are collected 72 and tested for whether they are within a preselected range; if any point is outside, an error path 80 is taken. Spectral data are acquired 82, and the dark spectrum is subtracted 84. Operating point 86 and corrections for stray light 88 and non-linearity 90 are explained below.

The corrected open beam spectrum $E_O$ (FIG. 5) should be similar to a stored reference spectrum $E_R$. To compare 91 (FIG. 3), a differential absorbance $A_D$ is computed:

$$A_D = \text{smooth}(\log_{10}(E_O/E_R)) \quad \text{Eq. 4}$$

This should be substantially zero across the spectral range. If more than a certain number of points (e.g. 9) exceed a preset figure (e.g. 0.03), errors are corrected or displayed. This procedure alerts for operator error (sample in holder), instrument drift (e.g. from temperature change) or instrument malfunction. If there is a drift, an operating point is reset automatically. Later in the procedure, a new reference open beam is acquired 93.

"Operating point" 95 refers to operating parameters to optimize performance and, in particular, designates the number of flashes for each integrated unit of spectral signals from the detector, and the voltage applied to the flash lamp. The object is to collect as much light as practical for each detector readout, by establishing an optimum number of flashes integrated by the detector and an optimum voltage for the lamp.

To determine the established number of flashes (FIG. 6), the instrument is operated in open beam mode 82 (without a sample cuvette) and with a preliminary number of flashes 94 (e.g. 3 flashes) and a preliminary voltage 96 so as to generate preliminary spectral transmission data. (Dark spectrum and corrections for stray light and non-linearity are not necessary.) A highest peak 98 in a spectrum of the open beam (FIG. 5) and its associated pixel location and preliminary peak height 100 are ascertained. As peaks generally are not centered in a pixel, a conventional procedure is used in an earlier procedure to determine peak locations and heights, for example the intersection of lines extrapolated from the two nearest pixels on either side of the peak.

The preliminary peak height is compared 102 with the preselected maximum peak height 104 which, as indicated above for the present example, is 4096 counts. From this comparison, for example by way of a ratio, determination is made for an adjusted number of flashes 106 required to effect an integrated unit of signal data which would yield corresponding spectral data with a corresponding peak height for the highest peak, such that the corresponding peak height is equal to or proximately below the maximum peak height. The term "proximately below" means below the maximum, and within a range associated with a variation of one flash in the adjusted number. The adjusted number is stored for use as the established number of flashes in an integrated unit for subsequent operation of the instrument. The number normally should be 2 to 6 flashes per integration unit. This number thus provides a relatively high amount of light in an integration unit while being below the saturation maximum.

Further to the operating point determination, an operating voltage is determined after the adjusted number of flashes is ascertained, so as to approach the maximum more closely. As indicated above, the operating means drives the light source with a source voltage such that the light source has an intensity with a dependence on the source voltage. In the present case of a xenon lamp the dependence is substantially linear, and in the lamp controller the voltage is the sum of a fixed voltage and a variable voltage from 0 to 150 volts.

To ascertain an operating voltage (FIG. 6), the instrument is operated 82 successively at least twice in the open beam mode and with the adjusted number 106 as the established number of flashes. The first operation is with a first source voltage 108, such as with the variable voltage set at zero, to generate corresponding spectral data with a first peak height 110 for the highest peak (the same peak as for the flash number determination). The second operation is with a second source voltage 112, such as with the variable voltage at 30 volts, so as to generate corresponding spectral data with a second peak height 114 for the highest peak. Two such operations are sufficient for linear dependence, but more may be done if the dependence is non-linear.

A functional (e.g. linear) dependence 116 is determined 118 between source voltage and the peak height by fitting the first and second source voltage and the first and second peak height. From this fit, an operational voltage 120 is determined 122 that is required to effect an associated peak height for the highest peak, such height being equal to or adjacently below the maximum peak height. The term "adjacently below" means below but as reasonably close as possible to the maximum, such as 4095 counts. For example 123 volts may be determined. This operational source voltage is set for driving the light source for subsequent operation of the instrument. It will be appreciated that adjusting operating point can compensate for considerable drift in the instrument and variations between instruments.

At this stage, advantageously another open beam spectrum is acquired and stored for future use as the reference spectrum $E_R$ (FIG. 3). Other determinations of the reference spectrum could be made, such as initially at the factory or a running average. However, acquision at this stage provides a recent reference that negates earlier instrument drift.

The above-described determination of number of flashes in an integrated unit, established to provide a relatively high amount of light in an integration unit while being below the saturation maximum, may be extended to encompass a non-flashing lamp. Thus a lamp may be on continuously at least for an integration time, and the detector integrates signals for an established duration to effect an integrated unit of the signal data. To determine the established duration, the instrument is operated without a sample and in a preliminary duration (replacing preliminary number of flashes 94, FIG. 6) of integrating signals, so as to generate preliminary spectral data. A highest peak is ascertained in the preliminary spectral data. This peak has an associated preliminary peak height which is compared with a preselected maximum peak height to determine an adjusted duration (replacing adjusted number of flashes 106) required to effect a unit of signal data and corresponding spectral data with a corresponding peak height for the highest peak. The corresponding peak height is equal to or proximately below the maximum peak height, the adjusted duration being stored for use as the established duration for subsequent operation of the instrument.

As indicated above, the instrument operates over a full spectral range. For certain types of samples a narrower spectral range may be desired, for example 220 to 400 nm or 525 to 760 nm. Also it may be desirable to cover almost the full range with only some upper or lower end wavelengths omitted, such as 230 to 700 out of the 220 to 700 full range. The computer processes only the data for such narrower range. The narrower range may not have the highest peak that was used to determine the optimum operating point of number of flashes and lamp voltage to achieve maximum transmission of light. The light transmission for the narrower range, therefore, may not be as high as could otherwise be attained. A "zoom" procedure is used to adjust the light transmission upward.

Figure 6:
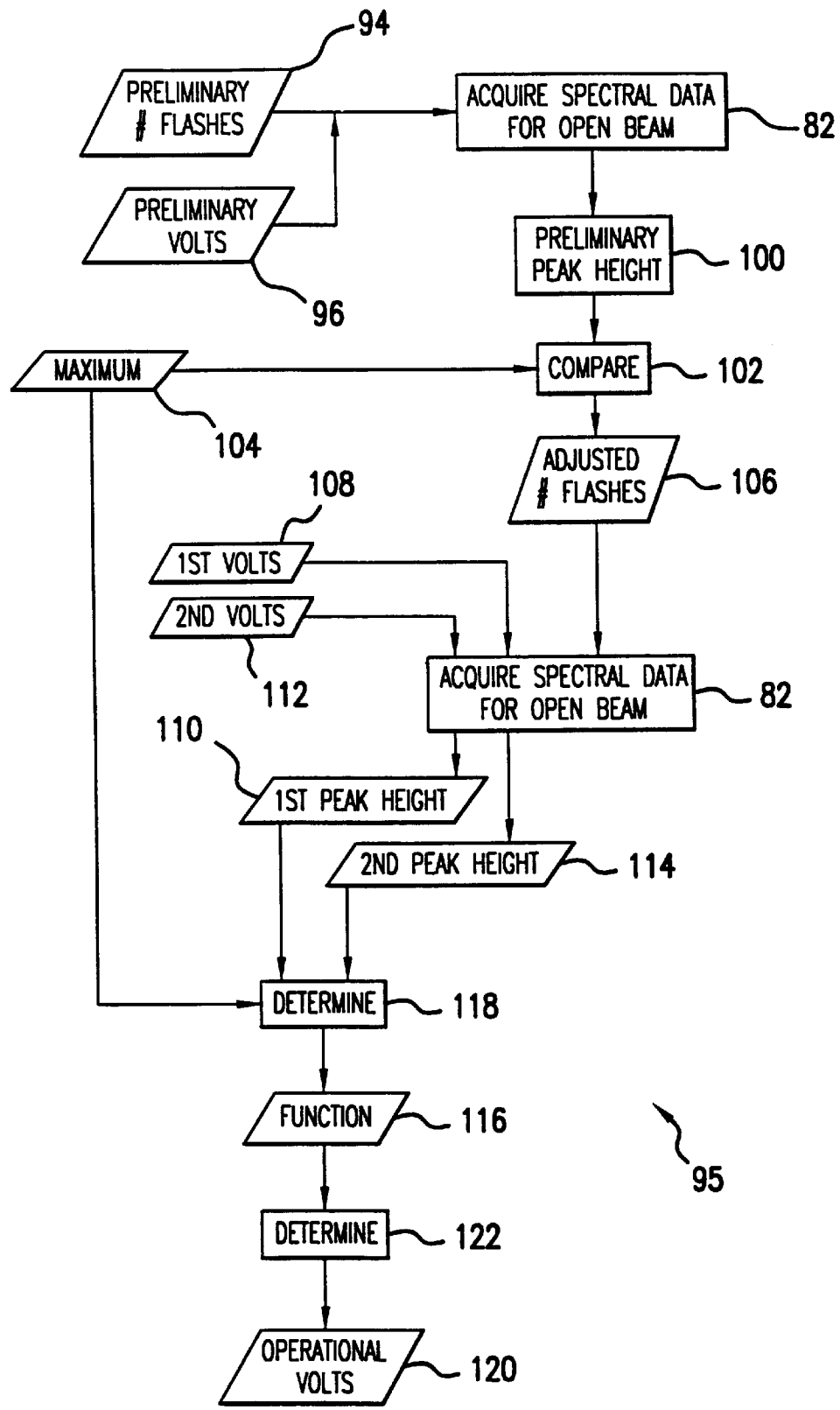
FIG. 6 is a flow chart to determine an operating point for the instrument of FIG. 1.
Figure 7:
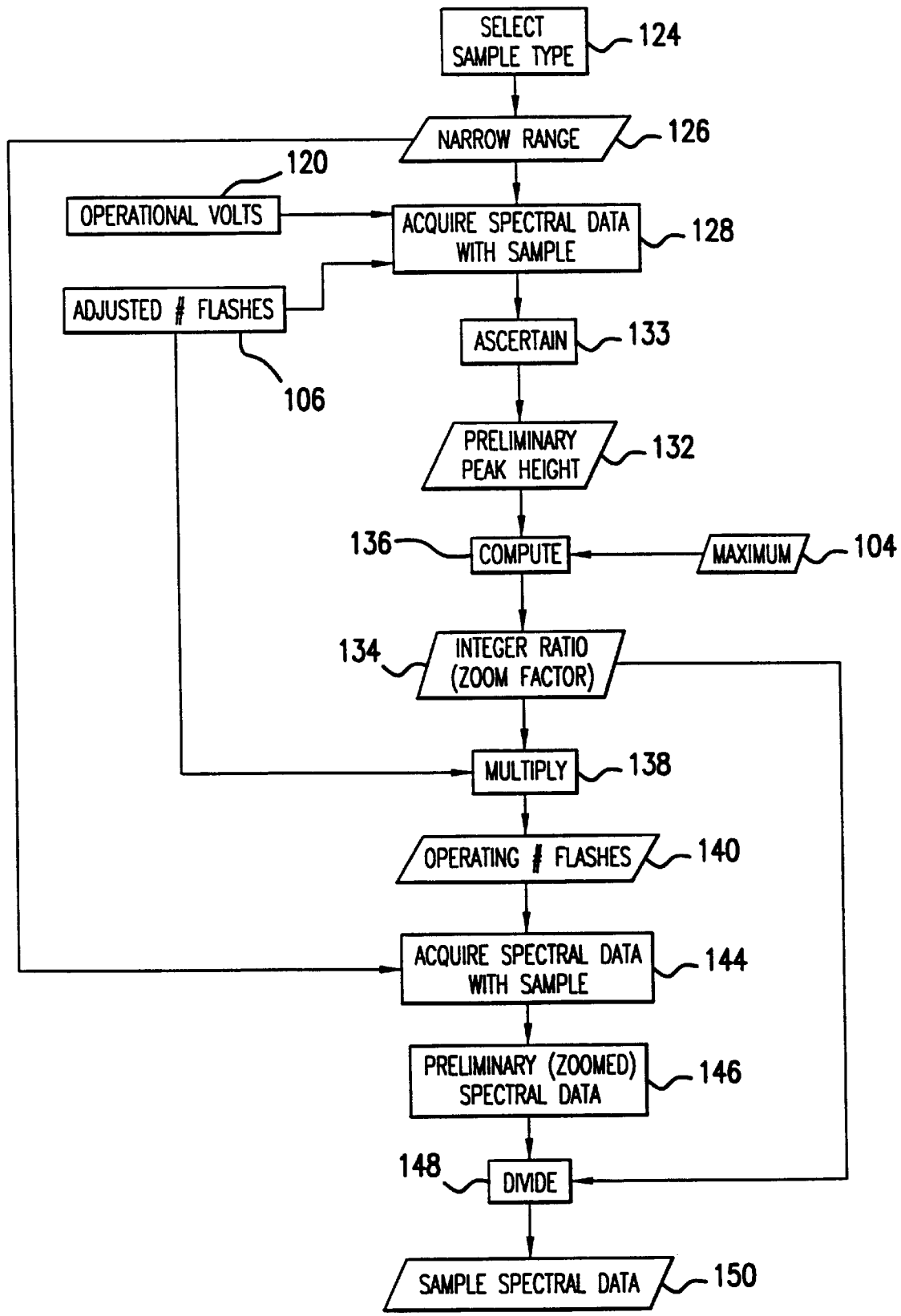
FIG. 7 is a flow chart for modifying the operating point of FIG. 6.

For this procedure, an adjusted number of flashes 106 and operational voltage 120 have been determined previously as described above (FIG. 6). When a sample type is selected 124 (FIG. 7) by a button on the touch screen, a narrower spectral range 126 (within the full range) may be selected automatically (or alternatively as a direct manual selection). The instrument is operated to acquire spectral data 128 with the selected sample and with the previously-determined voltage and the adjusted number as the established number of flashes. The processor effects corresponding spectral data only in the narrower spectral range. A highest peak 130 (FIG. 5) and a corresponding preliminary peak height 132 (FIG. 7) are ascertained in this range.

An integer ratio ("zoom factor") 134, i.e. a ratio of integers, is computed 136 that approximates an actual ratio of the preselected maximum peak height 104 (e.g. 4096 counts) to the preliminary peak height 132. The zoom factor is such that it can be multiplied with the adjusted number (an integer) to yield another integer number of flashes; thus the factor generally has a denominator equal to the adjusted number. For example, if the adjusted number of flashes is 3, a zoom factor of 6/3 may be a simple integer such as 2 to yield an increased operating number of 6 flashes, or the zoom factor may be 5/3 to yield an increased operating number of 5 flashes. Although not intended to be restricted as such, the adjusted number generally may be from 2 to 6 and the zoom factor may be up to about 12. With the increased number, the total number of flashes (e.g. 120) remains the same, so it also is desirable for the increased number to be divisable into such total number. The adjusted number 106 then is multiplied 138 by this zoom factor to determine an increased operating number 140 for the established number of flashes.

The instrument then is operated in a zoom mode to acquire spectral data 144 with the selected sample and the operating number as the established number of flashes. Preliminary spectral data 146 are effected for the selected sample in the narrower spectral range 126 with the operating number 140, and (preferably after corrections for stray light and non-linearity) the preliminary spectral data are divided 148 by the integer ratio 134 to effect sample spectral data 150 representative of the selected sample. (Sample data acquisition is described more fully below.) It will be appreciated that this zoom procedure does not require a flash lamp, and may be utilized more broadly with a continuous lamp and integration for detector readouts being for an established duration in place of an established number of flashes, with an adjusted duration replacing adjusted number, and operating duration replacing operating number.

Several other determinations generally may only be done once, such as at the factory or otherwise initially unless a significant change has occurred in the instrument. Operations and computations for these determinations do not need to be incorporated into the automatic processing of the instrument, just the results.

One such determination is for stray light which is unwanted light passing to the detector. In a well enclosed system the stray light has been attributed primarily to grating imperfection. To determine a correction, the instrument is operated with a standard sample that has a standard absorbance curve with a high absorbance level at a selected spectral position and low absorbance in other spectral positions. An industry standard such as sodium nitrite which has been used for measuring stray light may be used in an extended manner for the present application. This typically has a standard absorbance curve with an absorbance (without stray light) of about 5 at the low wavelength end of the present range. A standard spectral range in this low end is selected for the stray determination, such as 350 to 370 nm, with a range of 60 pixels. Measured absorbance of the standard at the low wavelength is generally reduced by stray light, for example 2.1. For present operational purposes an attainable, standard high absorbance $A_{Sel}$ such as 3 is pre-established for the standard range.

Figure 8:
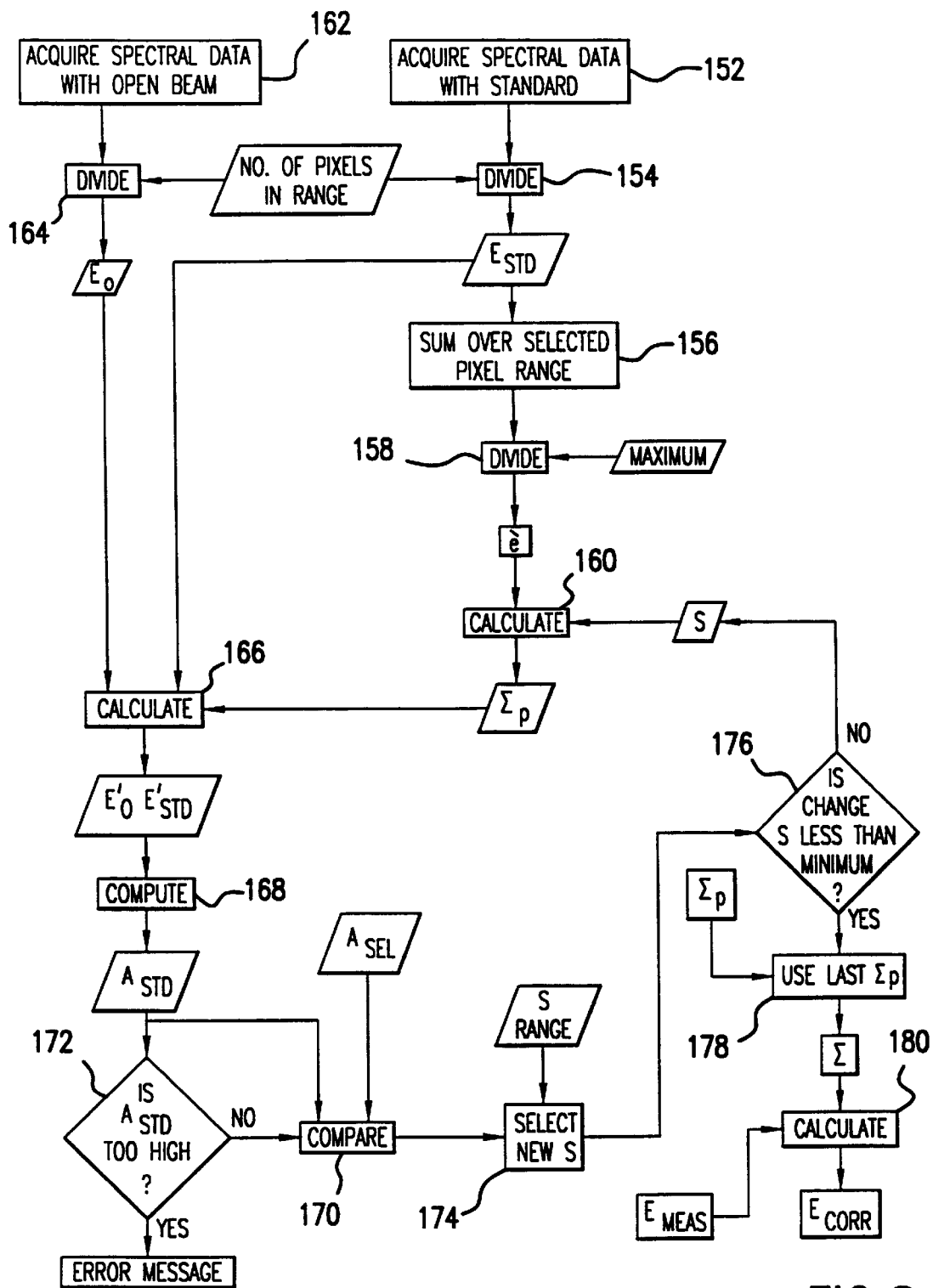
FIG. 8 is a flow chart for correcting for stray light in the instrument of FIG. 1.

Standard spectral data (FIG. 8) are acquired 152 (preferably corrected for dark spectrum) for the standard sample in the standard range, and these measured data are divided 154 by the number of spectral increments (of one or more pixels) in this range to effect standard spectral (energy) data $E_{Std}$ which has been reduced. The resulting data are integrated (summed) 156 and the result is normalized by dividing 158 by the maximum possible value, i.e. the saturation value of 4096, to effect an average energy $\grave{e}_{Std}$ for the standard. A factor S is to be determined iteratively, the factor having a value within a preselected range such as 0 to 300, advantageously with a binary search. An initial value (150) is selected and a preliminary correction value $\Sigma_p$ for stray light is calculated 160 from $\Sigma = S * \grave{e}_{Std}$. An open beam spectrum $E_O$ of measured open beam spectral data also is acquired 162, which may be the most recent from previous procedures and corrected for dark spectrum, and divided 164 by the number of pixels in the range to effect reduced data. This reduced spectral data $E_O$ and the standard energy data $E_{Std}$ are preliminarily corrected (respectively $E_O'$ and $E_{Std'}$) in a calculation 166 subtracting the correction, i.e., $E_O' = E_O - \Sigma_p$ and $E_{Std}' = E_{Std} - \Sigma_p$. These corrected data are converted 168 to a preliminary corrected standard absorbance $A_{Std}$ (using Eq. 1) for the standard. This preliminary absorbance is compared 170 with the pre-established standard high absorbance $A_{Sel}$. If the corrected absorbance is much too high 172 a problem is indicated. Another S is selected 174: If the corrected absorbance is within range but too high, the next factor S is decreased; if too low the next factor is increased and the iteration of the binary search is repeated. When the corrected absorbance substantially equals the standard absorbance, such that a subsequent change in S is less than a preselected minimum (e.g. 2) 176, the iteration is terminated and the last value for $\Sigma_p$ is used 178 as the correction value $\Sigma$ for stray light. In subsequent calculations 180 this correction is subtracted from measured spectral data $E_{meas}$ (open beam, sample or blank) to effect corrected spectral data $E_{corr} = E_{meas} - \Sigma$.

The use of a factor S in a formula with integrated energy $\grave{e}$ for determining the correction value $\Sigma$ is advantageous for containment to a reasonable number of steps of iteration. Other approaches to iteration may be taken in the means for iteratively determining the stray light correction value. For example, the correction value itself could be estimated initially for preliminary computation of the absorbance, with new values being entered iteratively based on comparison with the pre-established absorbance. Similarly, the iteration could be stopped when the computed absorbance is within a selected minimum deviation from the pre-established absorbance. Although particularly suited for the present instrument utilizing a flash lamp, it will be appreciated that the foregoing procedure for stray light does not require such a lamp.

Figure 9:
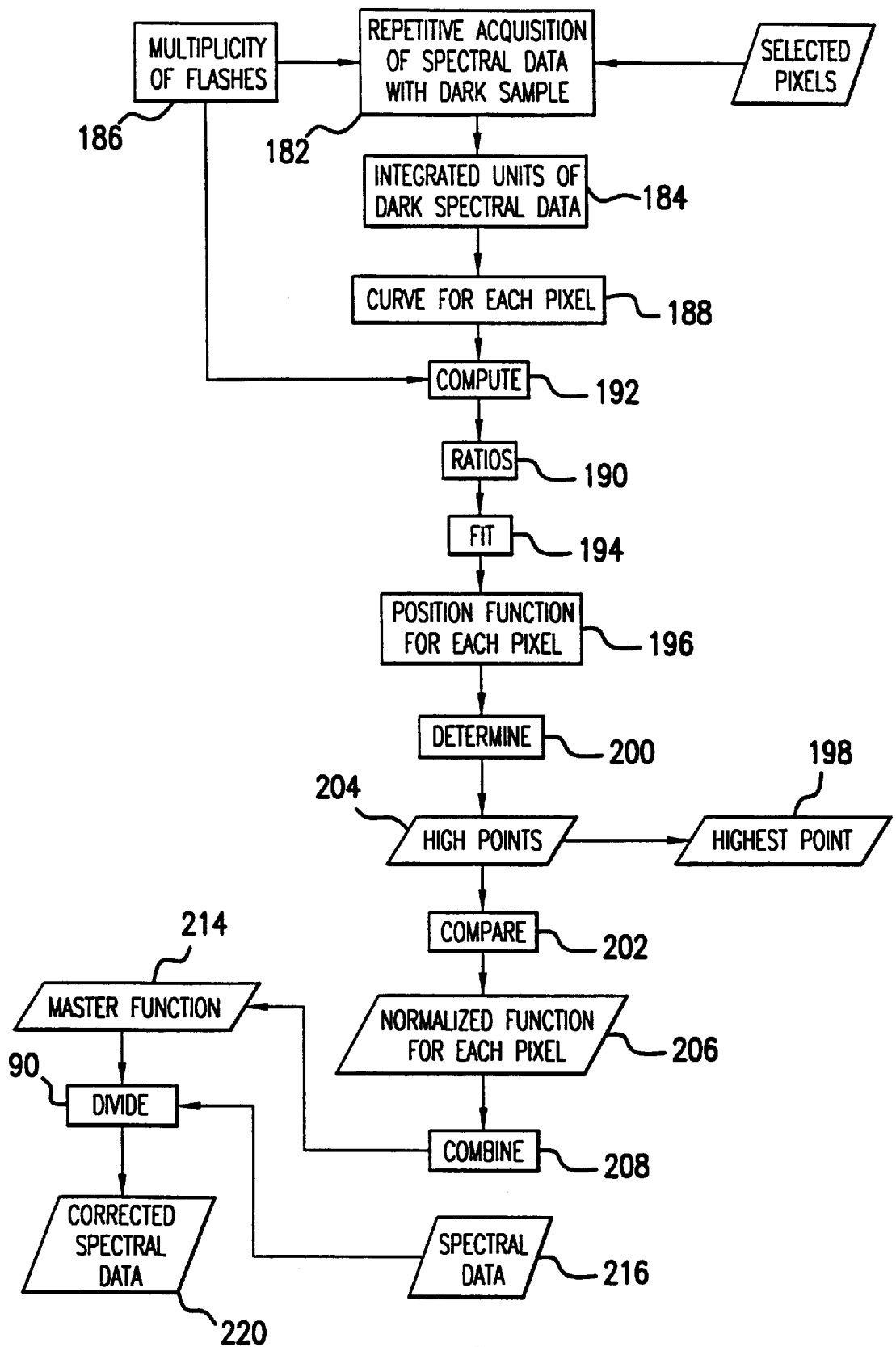
FIG. 9 is a flow chart for correcting for non-linearity in the instrument of FIG. 1.
Figure 10:
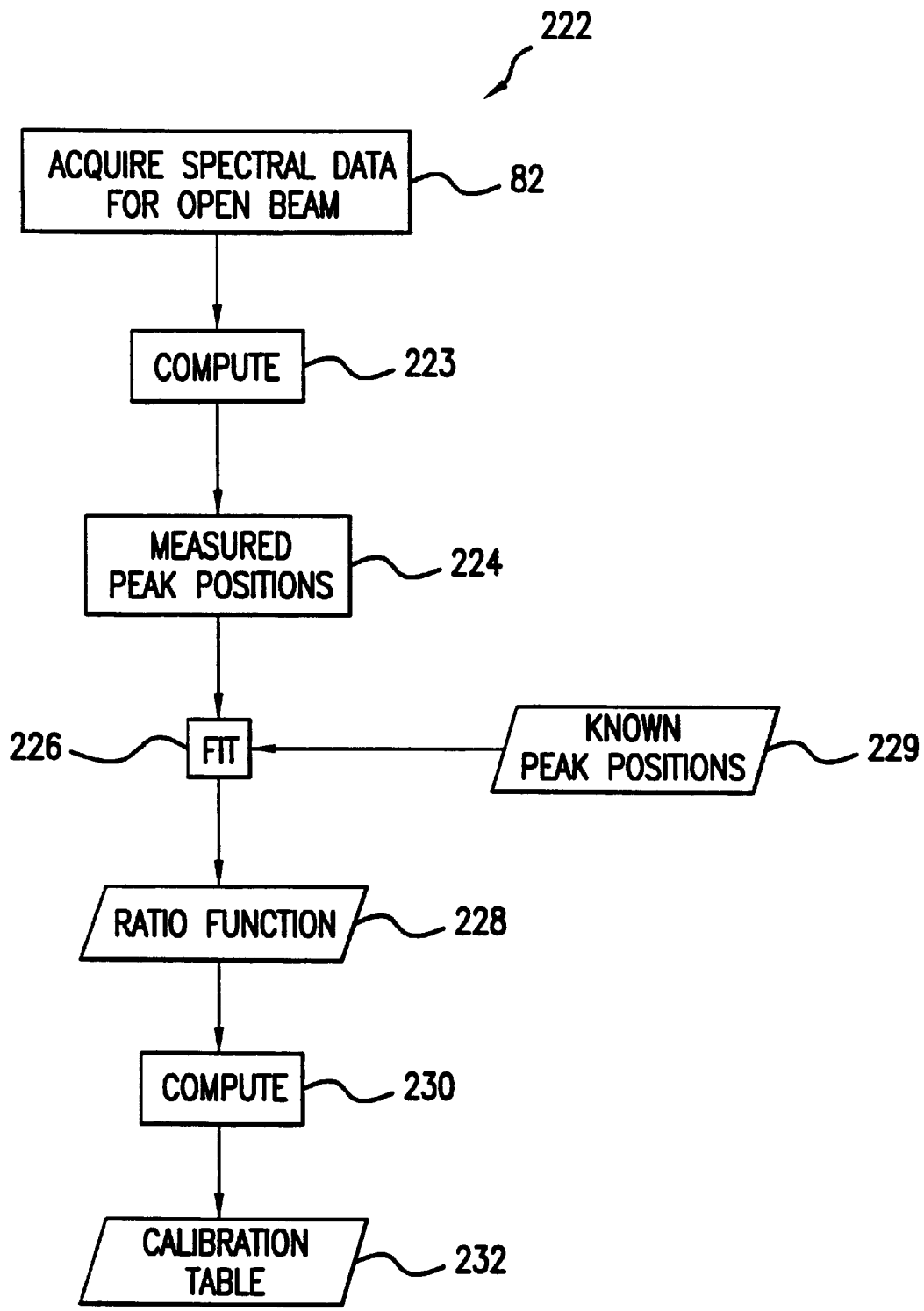
FIG. 10 is a flow chart for wavelength calibration of the instrument of FIG. 1.

Correction for non-linearity (FIG. 9) of detector response also may be determined only initially unless a significant change has occurred. A dark sample is utilized that passes a low transmission of the light beam. The low transmission need only be nominally uniform across the spectral range. The instrument is operated repetitively 182 or with the dark sample to acquire a series of integrated units 184 of dark spectral data, the series being for a number set 186 of a multiplicity of different numbers of flashes covering most of the flash range, for example starting with 90 flashes and decreasing in 17 flash increments down to 5 flashes.

The detector integrates and reads out the spectral data for each number of flashes. To reduce the size of the data and computations, the processor preferably selects only data for certain preselected spectral positions, such as every 10 pixels approximately evenly spaced, preferably at the higher spectral peaks. The maximum number of flashes should be that which passes a total energy almost equivalent to the saturation (e.g. 4096 counts). The result is a sequence of dark spectral data over the number set of flashes, for each preselected pixel.

Thus, for each preselected pixel, there is a curve 188 of spectral transmission data for increasing input energy represented by the sequential numbers of flashes. This would be a straight line if the instrument were linear, but there generally is a droop in the curve. Ratios 190 of the sequenced dark spectral data (representing transmitted energy) to corresponding number of flashes 186 (representing input energy) are computed 192. The ratios vs. number of flashes are fitted 194 to a position function 196 (e.g. by least squares to a quadratic equation) for each pixel, thereby generating a separate function for each of the 10 pixels. Although a plot of each function would be a horizontal straight line if the instrument were linear, such a plot generally will show a smooth curve with a peak. Each pixel will have a similar curve but at a different level, and each curve will have a high point. There will be a highest curve with a highest point (generally not at an integral flash count). The height 198 of this highest point is determined 200 and compared 202 with the other high points 204 to normalize the position functions for all of the other curves so as to create a set normalized functions 206 for each pixel that are nearly equal. The normalized functions are combined 208, for example by being effectively superimposed on each other and a least squares fit applied to all the functions to yield a master function 214 of energy transmission vs. flash counts, representing transmitted energy vs. input energy. Other methods of combining may be used such as averaging, or the high points may be replaced with points on the curves at any selected pixel. The master function is stored as a master data table of correction factors to be applied to measured spectral transmission data. To linearize actual spectral data 216, it is divided 218 by the conversion factor associated with the measured data point in the table, to effect corrected spectral data 220.

Figure 5:
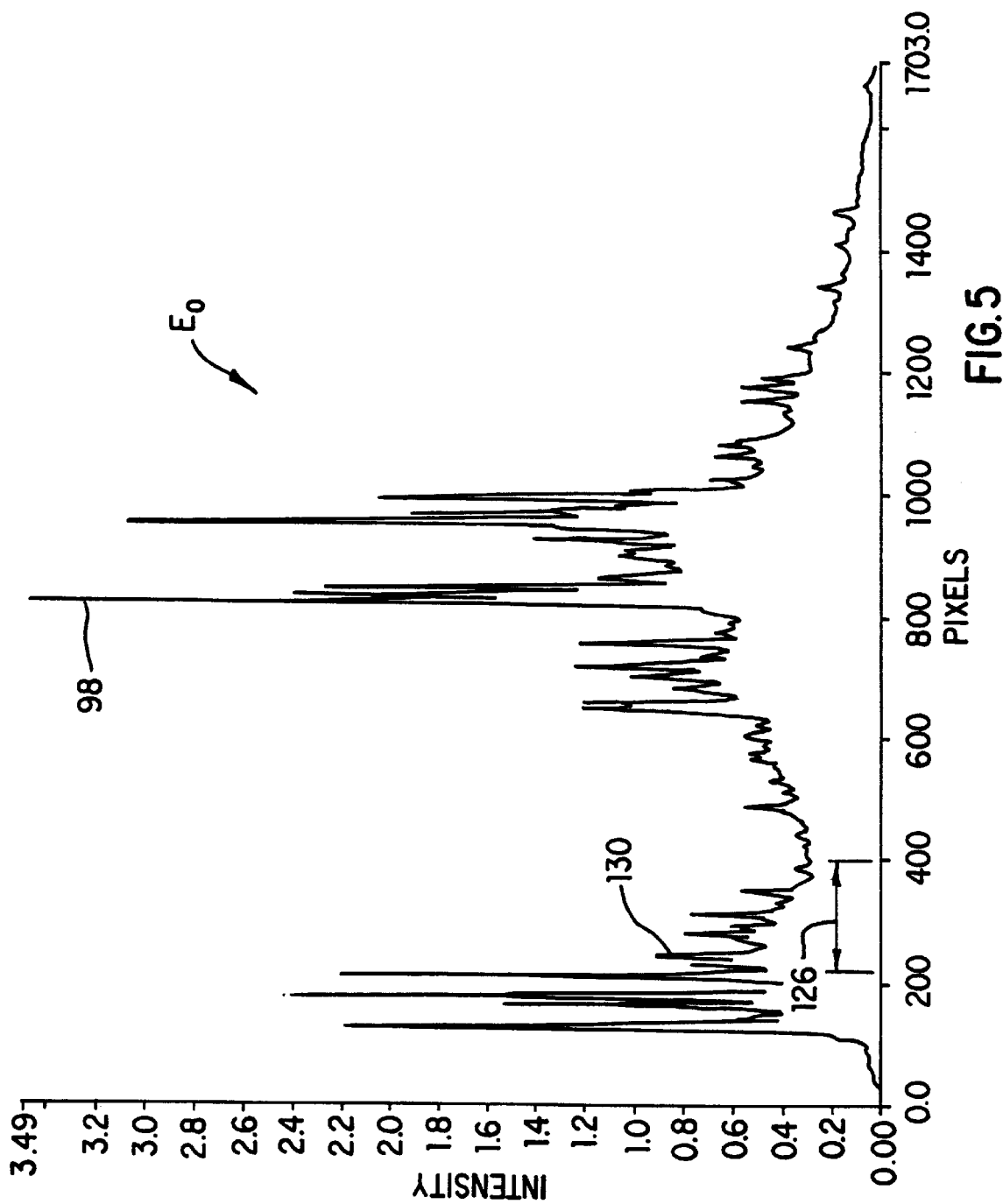
FIG. 5 shows a typical open beam spectrum for the open beam of FIG. 3.

Returning to the open beam sequence (FIG. 4), after corrections for stray light 88 and non-linearity 90, wavelength calibration 222 (FIG. 3) is performed. The selected lamp, being a flashing xenon lamp in the present case, emits a source beam having a plurality of spectral peaks having predetermined, known spectral positions (FIG. 5). The processing of spectral data 82 computes 223 measured spectral positions 224 of the spectral peaks, determined by extrapolations from the pairs of adjacent pixels as described above. A fit 226 to a function of ratios 228 of the measured positions to the known positions 229 for the xenon lamp light, for example by least squares quadratic. A further computation 230 yields a calibration table 232 of the measured spectral positions against the predetermined spectral positions. This stored table may be updated with each open beam operation. It will be appreciated that this wavelength determination may be made with a steady light source having spectral peaks, in place of a flashing light source. Alternatively, wavelength calibration could be performed without corrections for stray light or non-linearity. Similarly, the calibration could be carried out with a sample in place.

Figure 11:
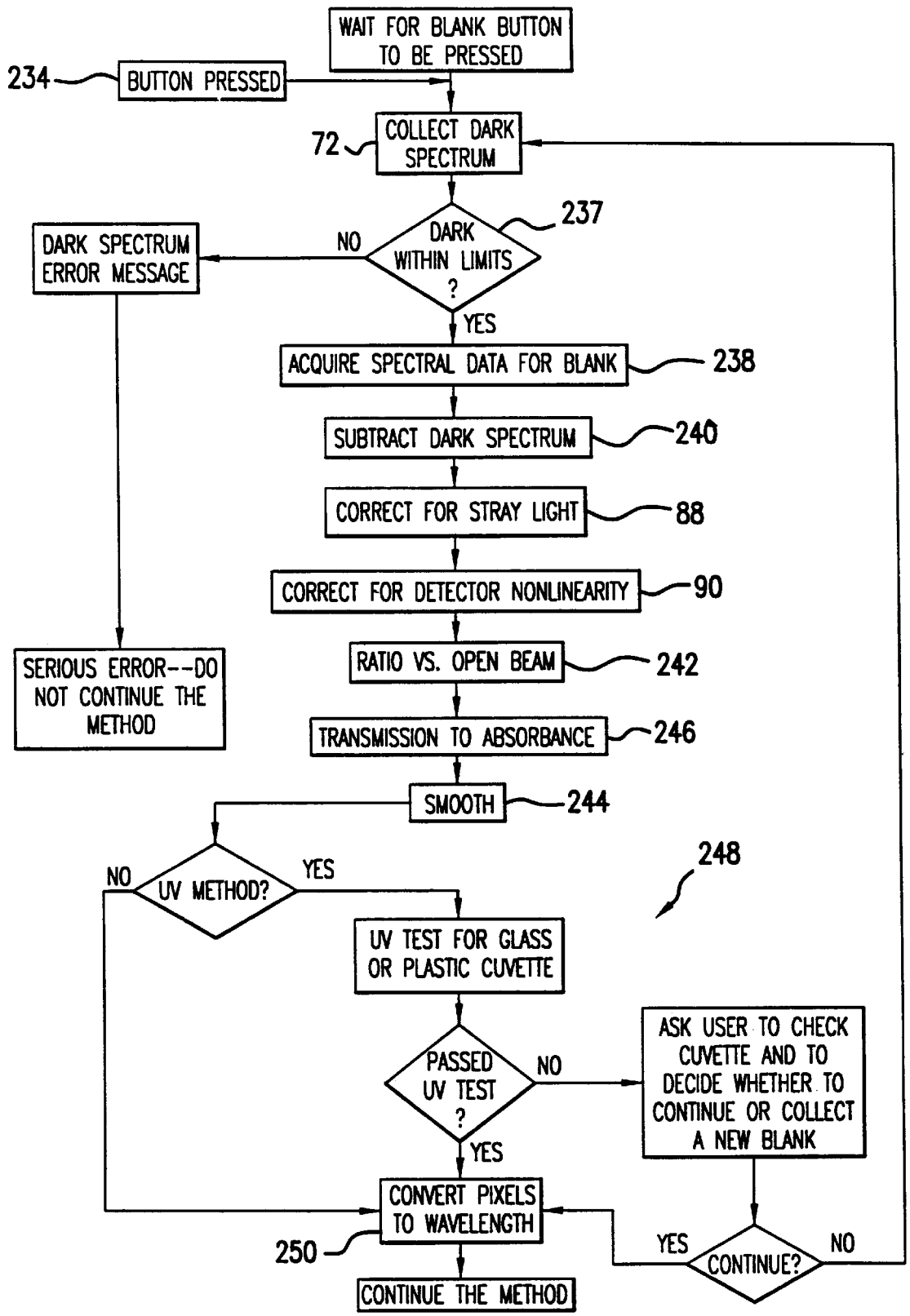
FIG. 11 is a flow chart for blank operation and processing with the instrument of FIG. 1.

After the foregoing open beam operations, a blank specimen is inserted in the receptacle, being a cuvette or other sample container with solvent or other carrier but without actual sample. Upon pressing of a button 234 (FIG. 11) on the touch screen, dark spectral data are collected 236 and tested 237, and then spectral data are obtained 238 for the blank. The dark spectrum is subtracted 240 from the blank spectrum, and corrections are made for stray light 88 and non-linearity 90. Ratio to open beam 242, smoothing 244 and logarithm compute the absorbance 246 (Eq. 2). A UV test 248 is performed; if absorbance at several wavelengths (e.g. 260, 280 and 320 nm) exceeds one, a problem is indicated. Pixels are converted to wavelength 250 to effect the spectral information for the blank specimen. Computations may be speeded up by conventional techniques such as using "floating point" averaging of every other pixel in computing the ratio 242.

Figure 12:
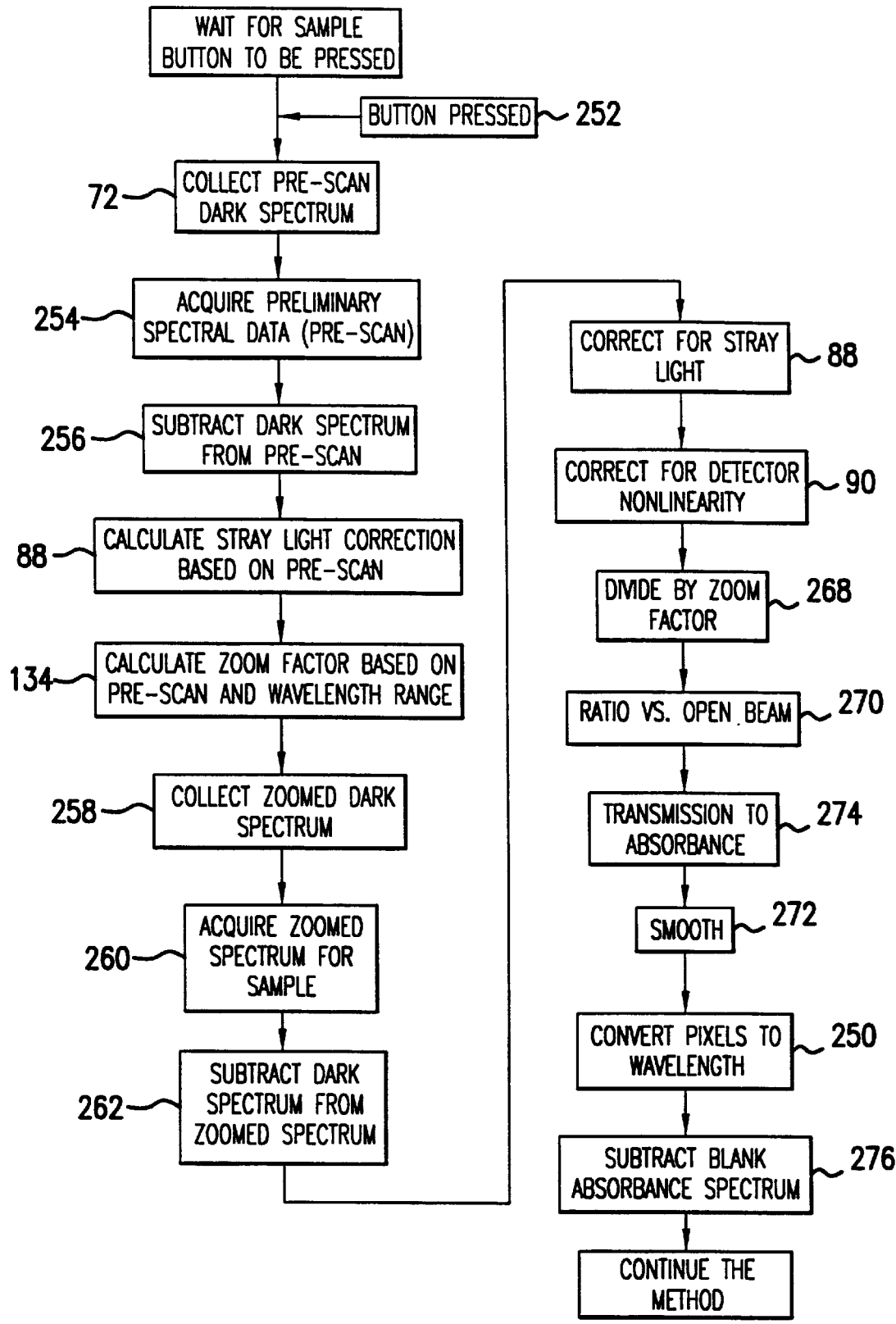
FIG. 12 is a flow chart for sample operation and processing with the instrument of FIG. 1.

Next a sample specimen is inserted in the receptacle. Upon pressing of a button 252 on the touch screen (FIG. 12), a dark spectrum is collected 72 again, and pre-scan for an acquisition of preliminary spectral data for the sample is obtained 254. The dark spectrum is subtracted 256, and correction is made for stray light 88. At this stage a zoom factor 134 is calculated as described above (FIG. 7), corresponding to the earlier button selection 124 of sample type with an associated narrower spectral range. If the spectral range for the selected sample type is the full range, the means and steps from the pre-scan to this point are omitted, and the zoom factor is one.

A dark spectrum is collected 258 in the selected zoomed mode (narrower spectral range, if any), spectral data are acquired 260 for the sample in the zoom mode, and the dark spectrum is subtracted 262. Corrections are made for stray light 88 and non-linearity 90, and the results are divided 268 by the zoom factor 134 from FIG. 7. Ratio to open beam 270, smoothing 272 and logarithm compute the absorbance 274 (Eq. 1). After conversion to wavelength 250, the blank absorbance is subtracted 276 to yield a final absorbance spectrum $A_F$ (Eq. 3) for the sample which may be displayed on the screen.

Other processing beyond the present purview of the invention may be carried out, such as computation and display of concentration, absorbance ratios at several wavelengths, spectral differences from different samples, comparison with stored spectra to identify sample constituents, and the like.

Auxiliary Information

In a further embodiment, the instrument accepts operator input of auxiliary data associated with the class of samples, and calculates auxiliary information derived from the input.

The term "auxiliary data" as referred to herein and in the claims, is data that is entered by an operator and does not include the spectral data that is acquired by the instrument and utilized directly in the computation of the spectral information. Similarly, "auxiliary information" is in addition or supplemental to the information computed from the spectral data. "Class of samples" refers to the general type of samples of interest to a user; in the present particular example it refers to samples in the field of microbiology dealing with nucleic acids and related proteins, particularly DNA and RNA; or in the petrochemical field the samples would include hydrocarbon fuels, additives and chemical derivatives. Incorporation of auxiliary calculations into the instrument is especially useful in a more complex field, particularly the microbiology. Those having ordinary skill in the particular field will readily identify the types of samples, auxiliary computations and databases useful in the field.

Typically a display of spectral information shows a corrected spectrum, concentration of the sample computed therefrom, and perhaps some related parameters and similar information. On the other hand, auxiliary data might be, for example, dilution factors and other data entered by an operator so as to compute concentration, the latter being auxiliary information used for preparation of samples. Other examples are computing proportions of sample additives, converting units, correcting concentrations for radioactive decay, and the like. The processor also may include a database of permanently stored data or terms, conversion factors and the like related to the sample class, in which case the auxiliary data may simply be a search term selected from a list on the touch screen. Such auxiliary data or information need not be interfaced with the computer processing of such retained spectral information or its computations. Alternatively, the auxiliary information may be further derived or computed from the spectral information retained in the processor from the instrument operation, or the calculated auxiliary information may be fed automatically back into the main processing for use in effecting the spectral information.

As an instrument typically is utilized in a particular field, it is particularly advantageous for the instrument to be dedicated to a specific technology such as microbiology, petrochemistry or elemental analysis. In such case the auxiliary database, computations and display are similarly dedicated. Integrating such calculation capabilities into the instrument along with the instrument functions provides a substantial convenience for an operator to make auxiliary computations and information retrievals associated with a sample and its analysis. Such an instrument may incorporate, for example, around a dozen such auxiliary computation modes. Particular examples of such modes are set forth below for biotechnology.

To implement the auxiliary aspect, a touch screen 59 (FIG. 1) is overlayed on the monitor with an interface between the touch screen and the CPU. The monitor displays a screen of labeled buttons (icons) of functions or alphanumeric characters. The operator touches a button on the screen to select an item or enter data. A package of touch screen with interface 61 and associated firmware programming may be any conventional or other desired system that can readily be adapted for the present situation.

EXAMPLES

Figure 13:
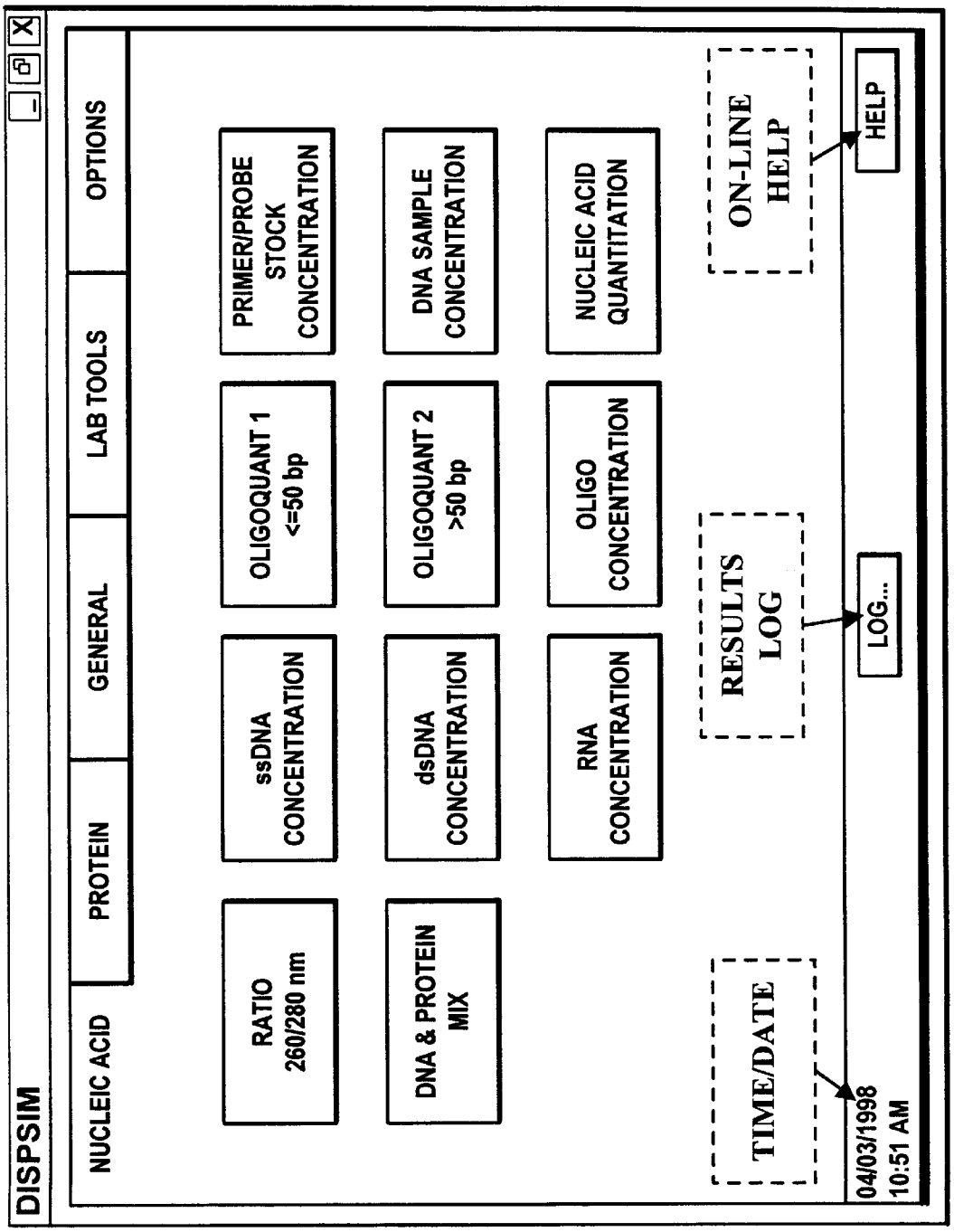
Figure 14:
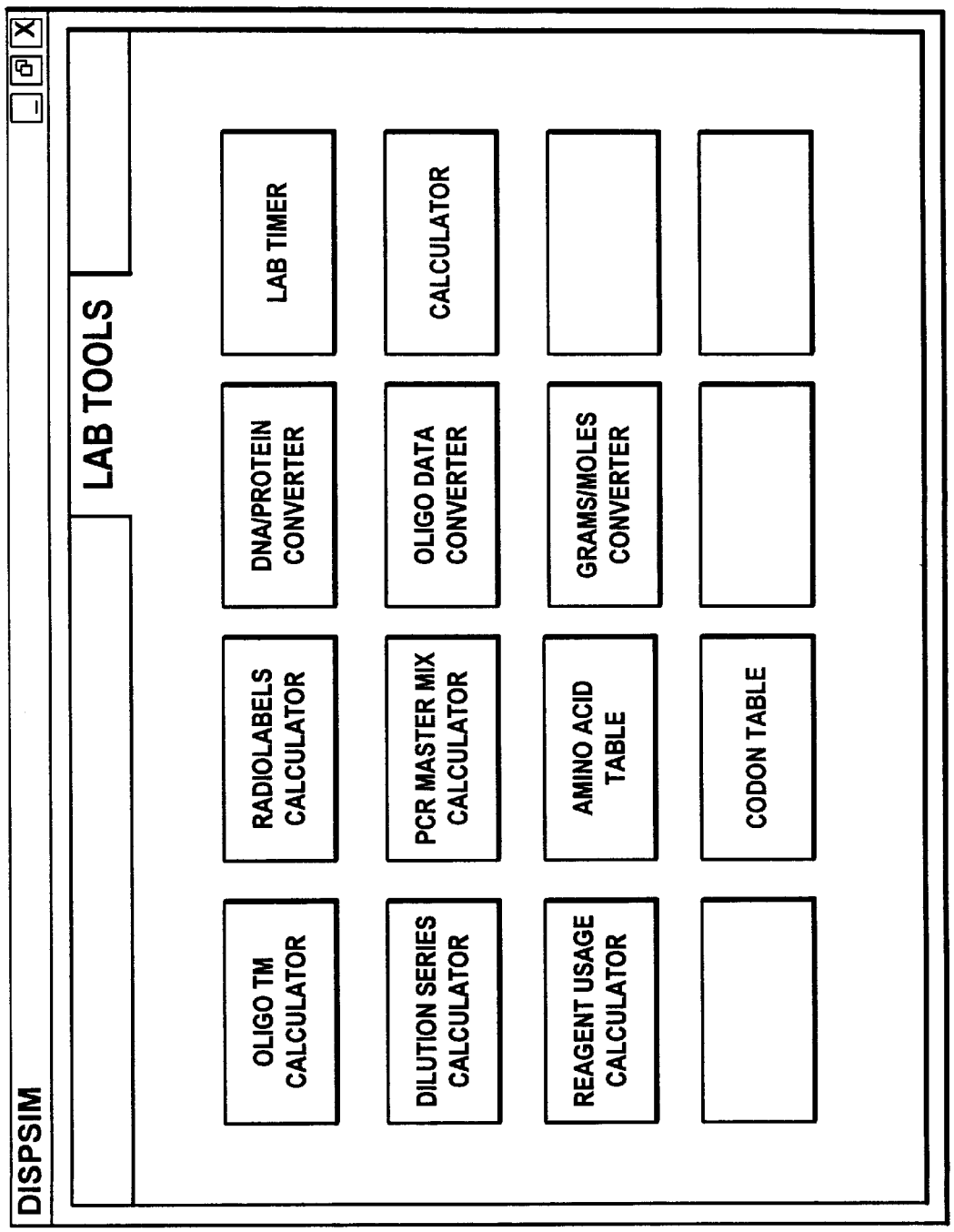

The following series of examples of displays and auxiliary operations are related to microbiology. The displays and operations are effected on the instrument monitor with a touch screen. An opening display (FIG. 13) appears when the instrument is turned on. This is a Nucleic Acid page which provides options for ordinary instrument operations for selected types of samples and associated spectral data and output information. The touch buttons for types of samples and desired output spectral information will readily be recognized by those in the field, and a selection will initiate a run as described above. Tabs for alternative operation or information are provided. Selection (by touching) of the Protein page tab extends the run choices to other proteins. The General and Options pages allow for changing instrument settings or types of runs, adding other operational buttons to the Nucleic Acid or Protein pages, and the like. Lab Tools brings up a display (FIG. 14) of options for auxiliary calculations and databases. The calculations may be quite simple or quite complex. A button is touched to select a desired operation. The following further examples address each of these. Formulae or equations for the calculations will be apparent in most cases.

Figure 15:
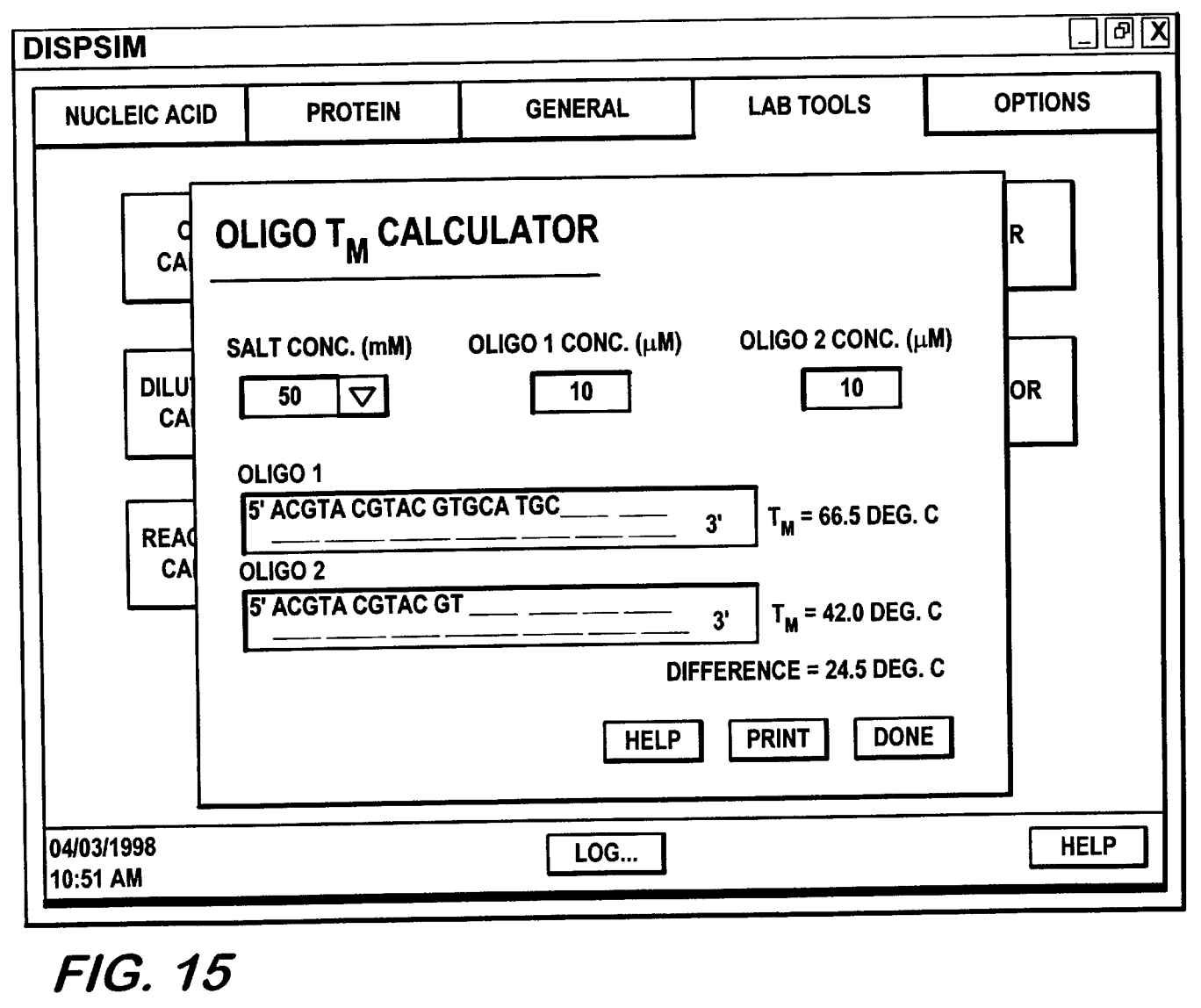

The Oligo Tm Calculator (FIG. 15) calculates melting temperature for short DNA pieces of oligonucleotide (oligomer) that may be entered under Oligo 1 and Oligo 2 (including DNA ends 5' and 3'). Depressed boxes receive data input, and information is calculated, in this case temperature. "M" is moles. The down arrow (or up in other cases) selects other ranges such as from mM to $\mu$M. The algorithm in this case is derived from an analysis set forth in "Nearest Neighbor Analysis" by K. Breslauer et al., Proceedings of National Academy of Sciences, vol. 83, pages 3746–3750 (1988).

Figure 16A:
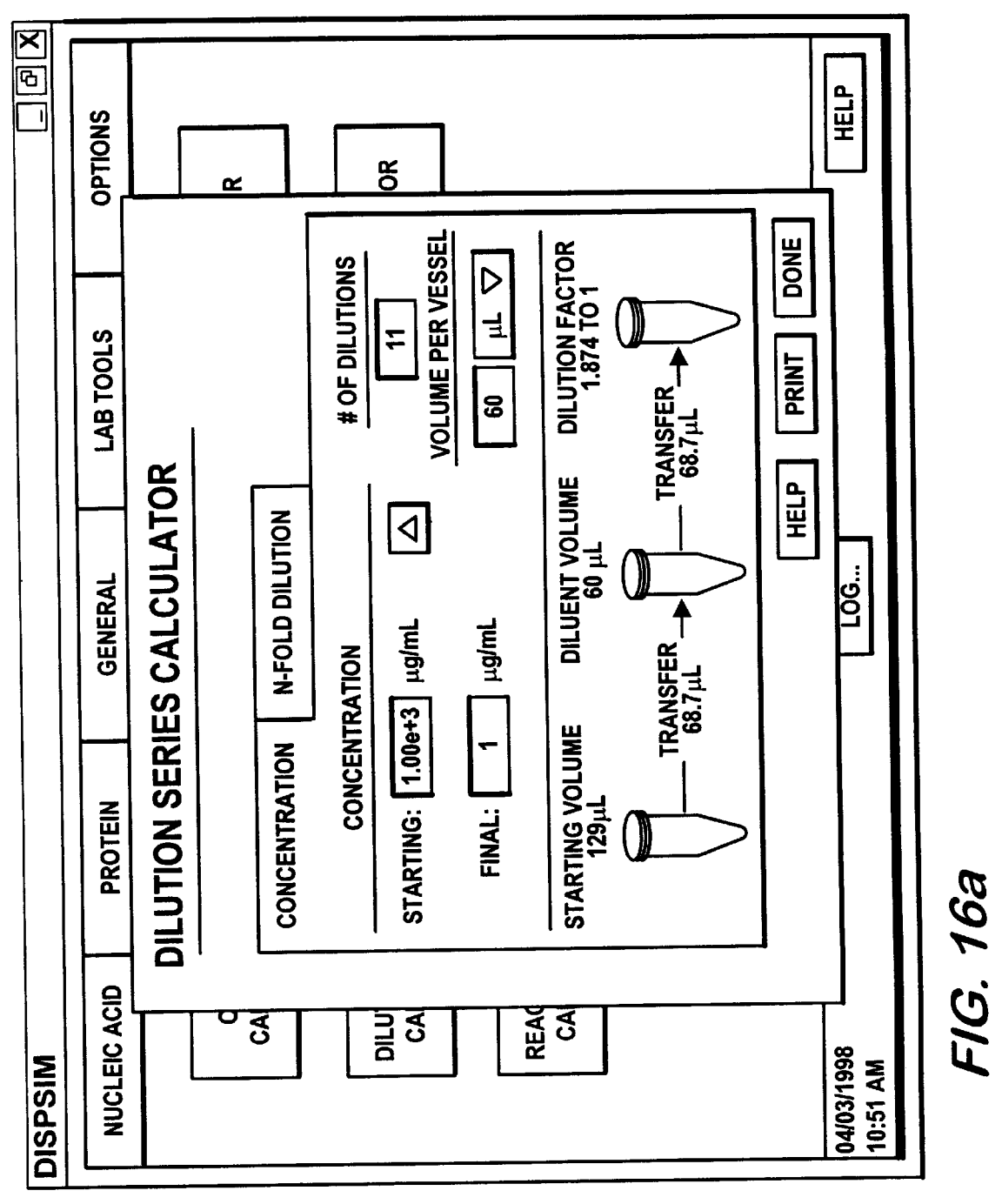
Figure 16B:

The Dilution Series Calculator for Concentration (FIG. 16a) calculates sample preparatory information from input of desired starting and final concentrations, number of dilutions and vessel volume. N-Fold Dilution (FIG. 16b) calculates starting and dilutant volumes.

Figure 17:
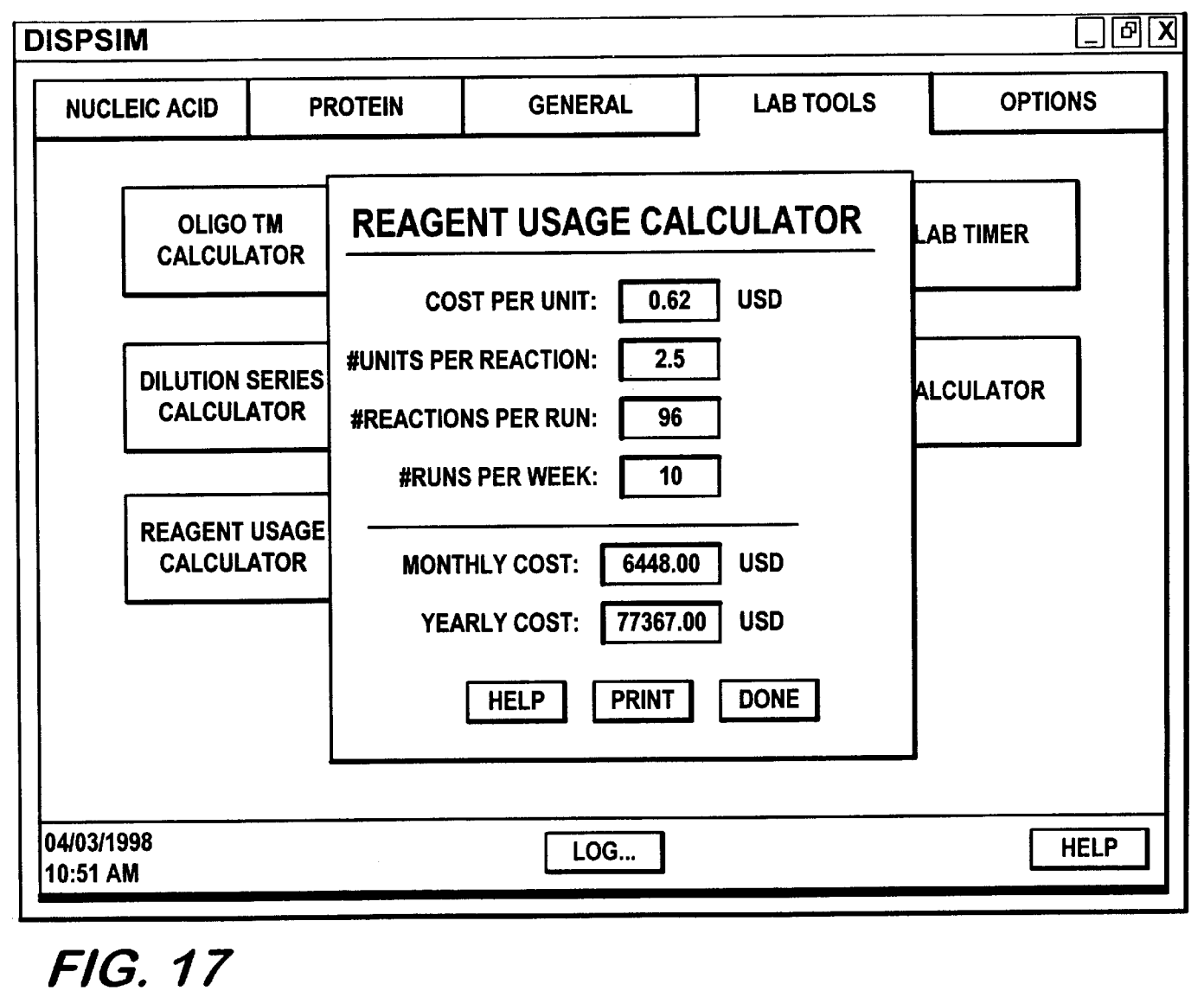
Figure 18:
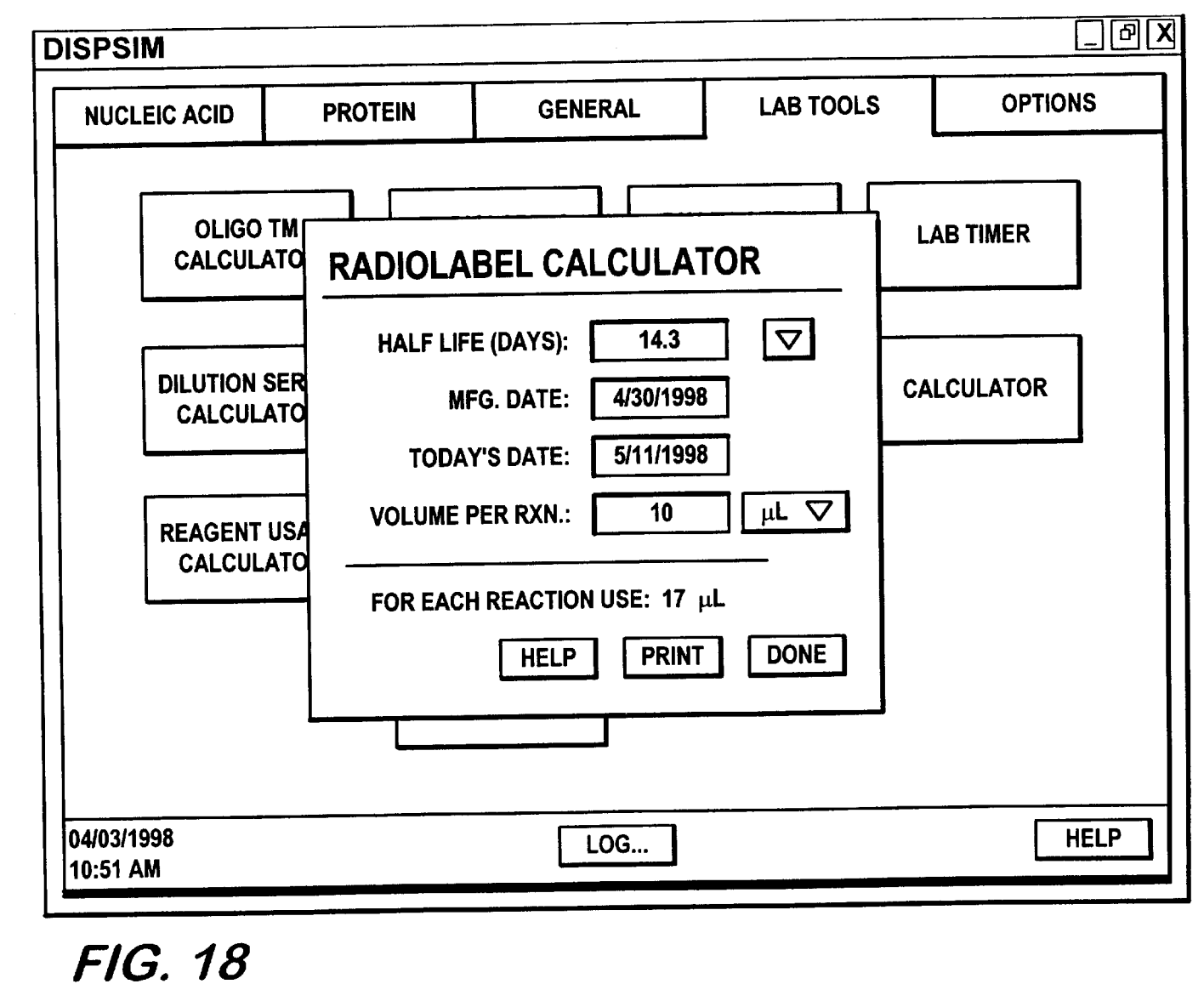

The Reagent Usage Calculator (FIG. 17) calculates reagent costs over time. The Radiolabel Calculator (FIG. 18) provides amount of reagent to use, corrected for radioactive decay. The PCR Master Mix Calculator, with three tabs labeled Reactions, Reagents and dNTPs (FIGS. 19a, 19b, 19c), provides mixing information. Terms are conventional in the field, e.g. "dNTP" is deoxyribonucleoside triphosphate, P1 and P2 are primers, "Taq" is DNA polymerase enzyme thermus aquaticus, "Rxn" is reaction.

Figure 20:
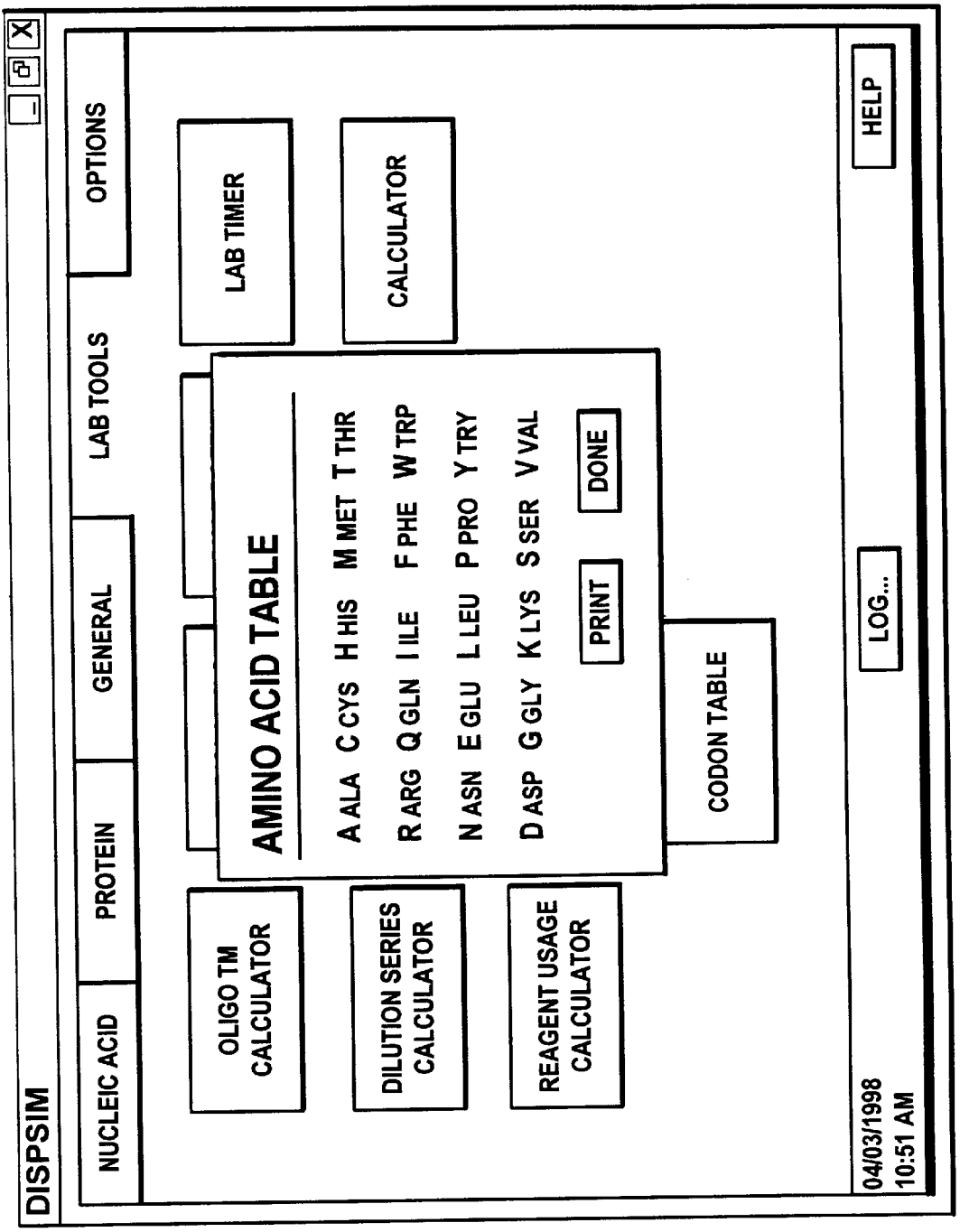
Figure 21:
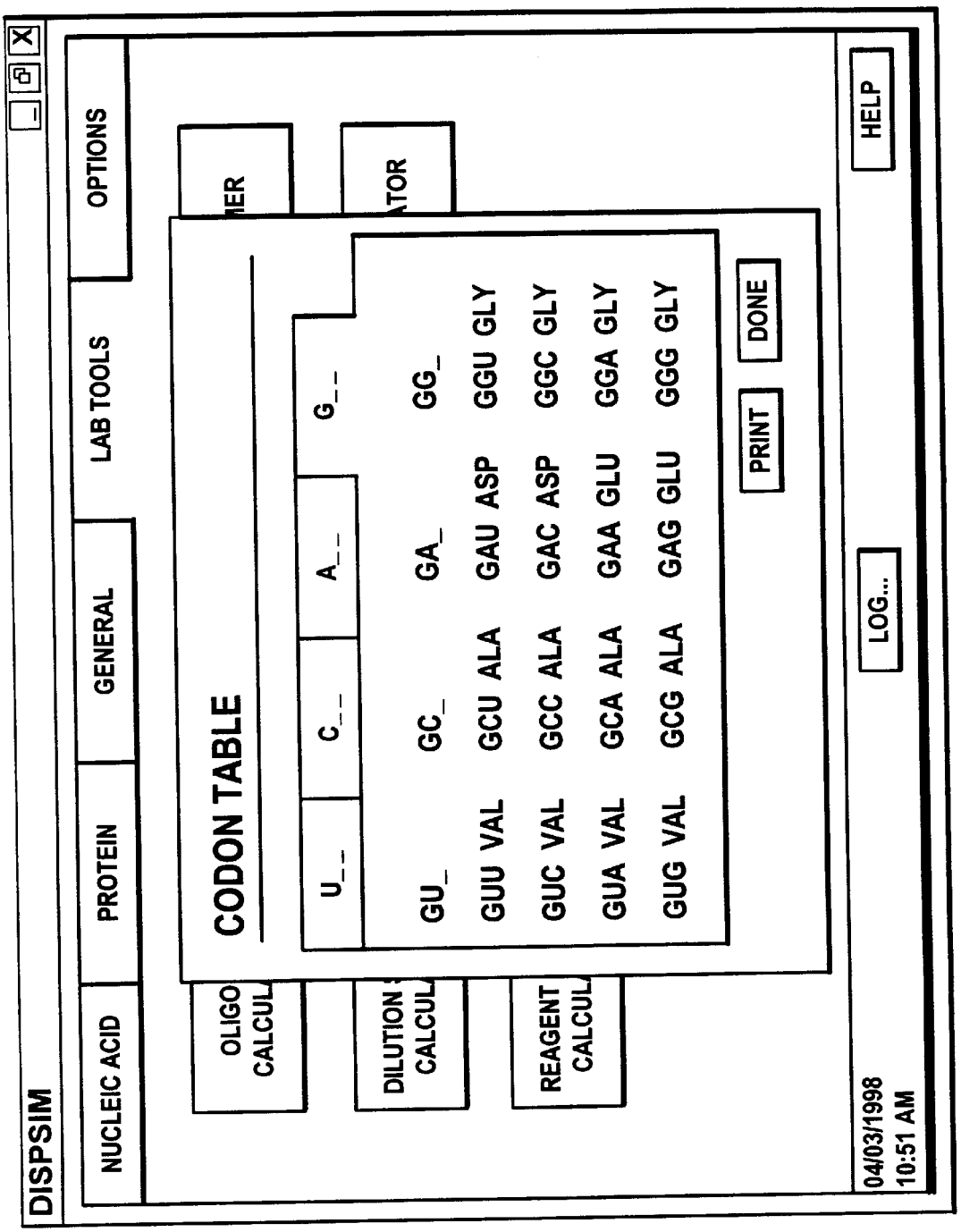

The Amino Acid Table (FIG. 20) is an example of simple database information, providing first letter codes for the amino acids based on their conventional 3-letter codes. Similarly, the Codon Table (FIG. 21) provides sequences of three adjacent nucleotides for the amino acids.

Figure 22:
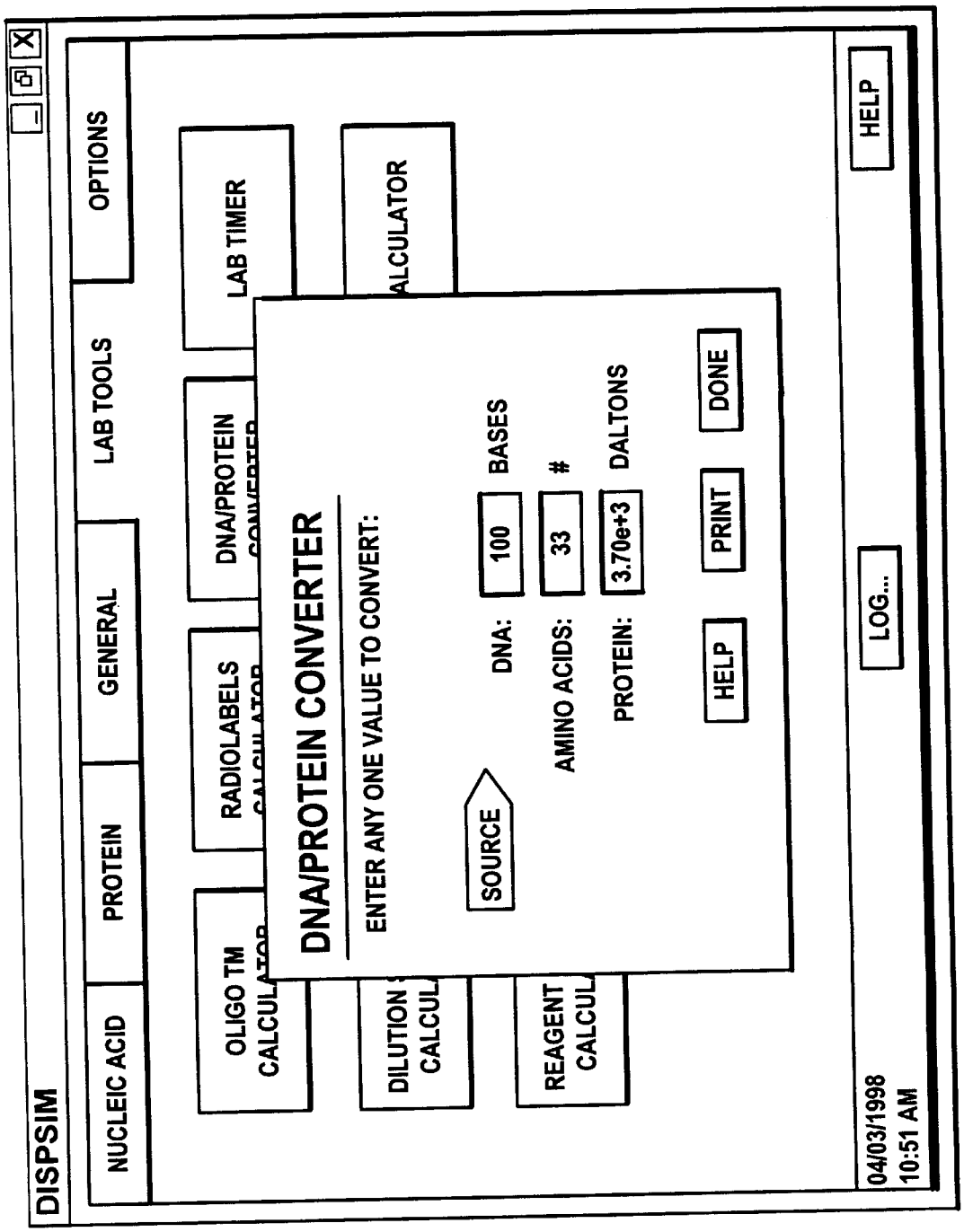
Figure 23:
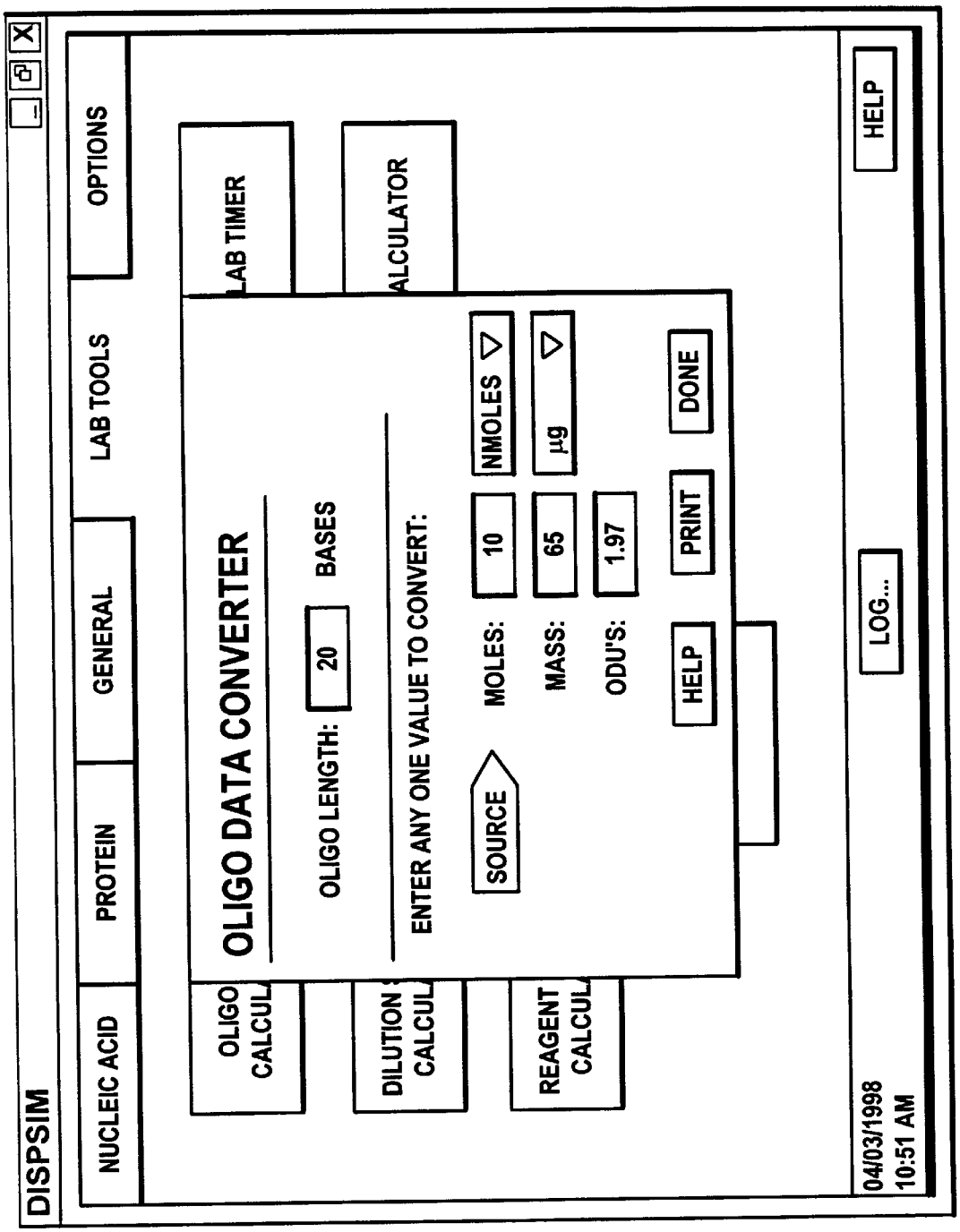
Figure 24:
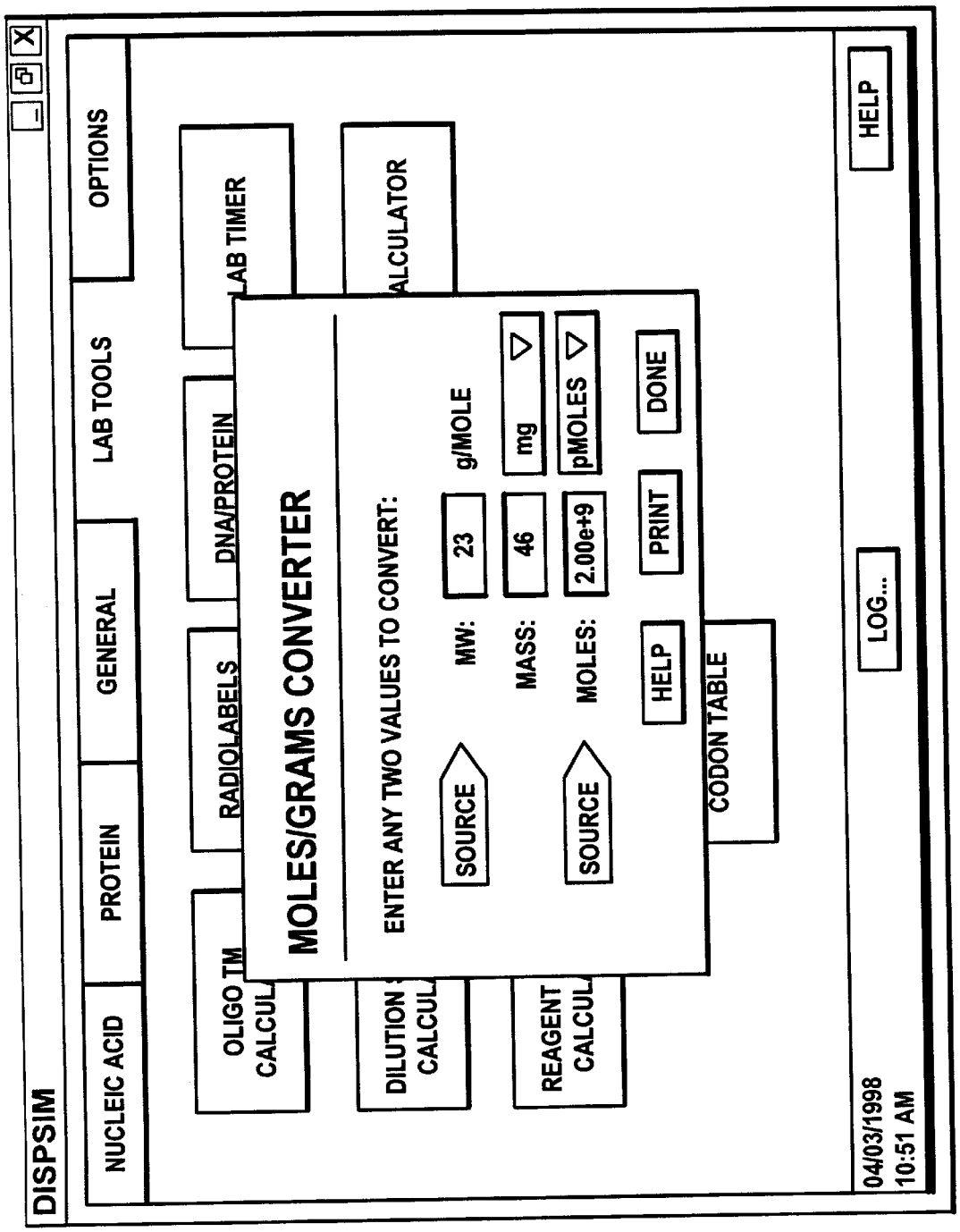

The DNA/Protein Converter (FIG. 22) converts between quanties of DNA, amino acids and proteins in a strand. ("Dalton" is 1 g/mole.) Similarly, the Oligo Data Converter (FIG. 23) converts between moles, mass and ODUs (optical density units) for an entered oligomer length. The Moles/Grams Converter (FIG. 24) converts between molecular weight (MW), mass and number of moles.

Figure 25A:
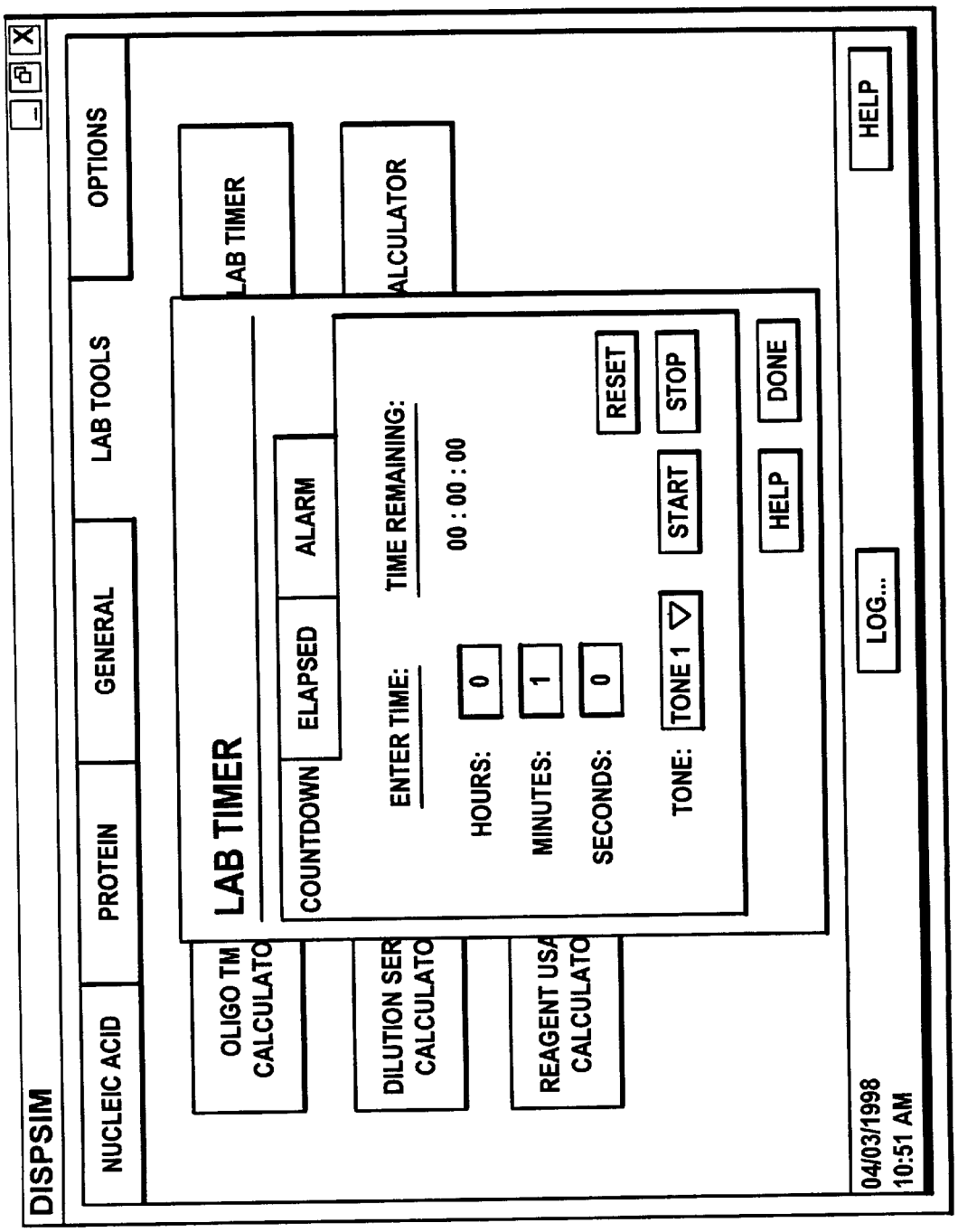
Figure 25B:
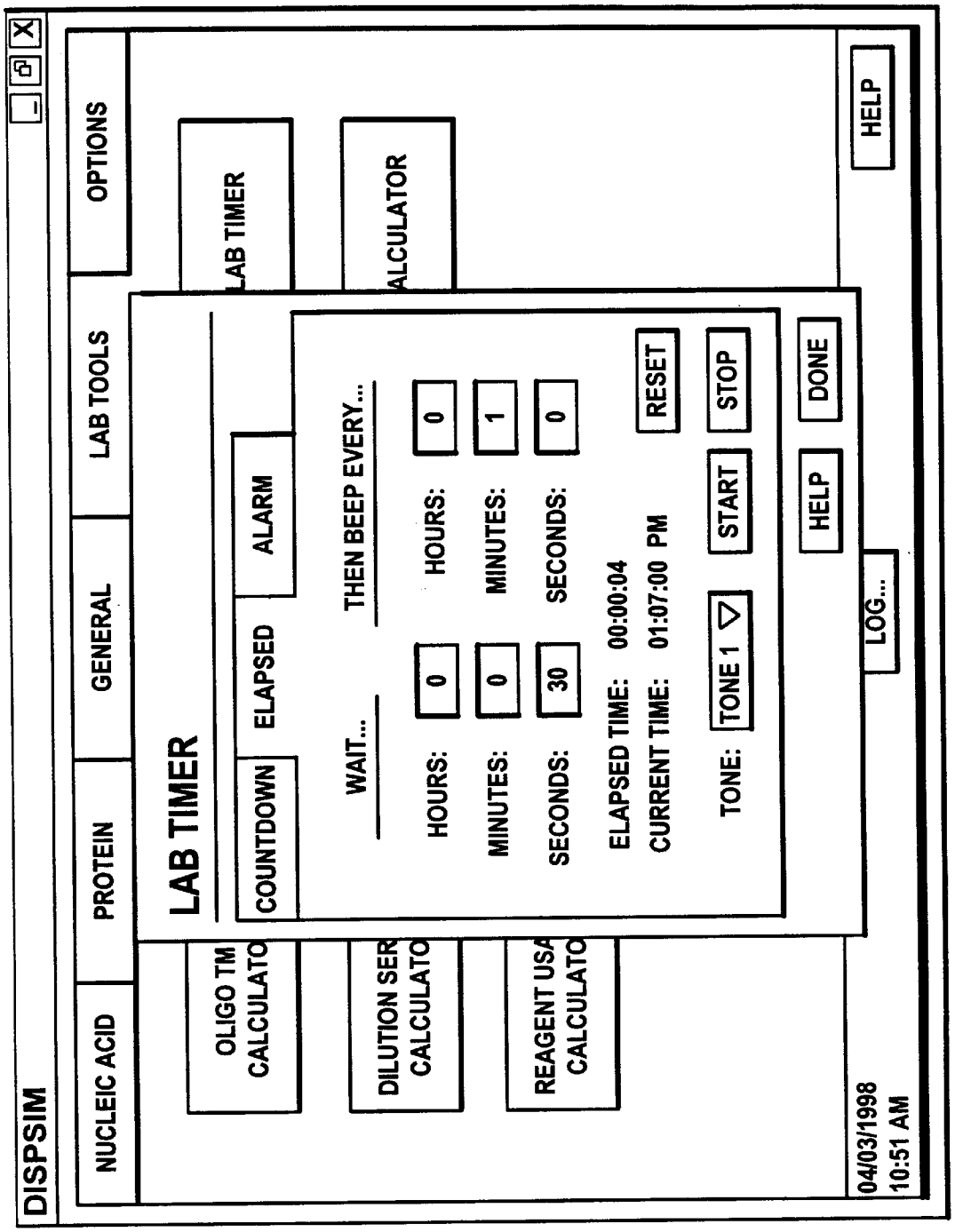
Figure 25C:
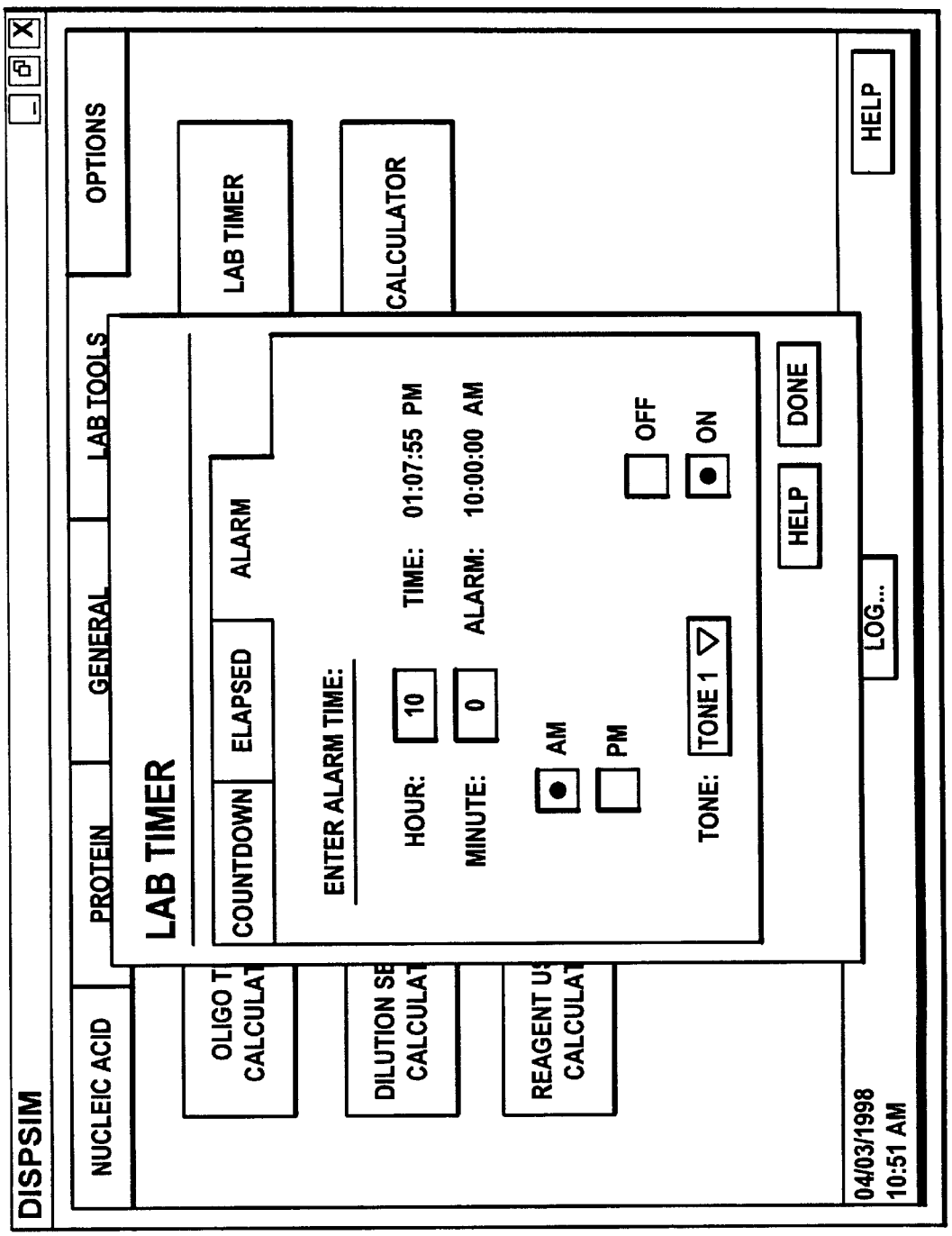
Figure 26:
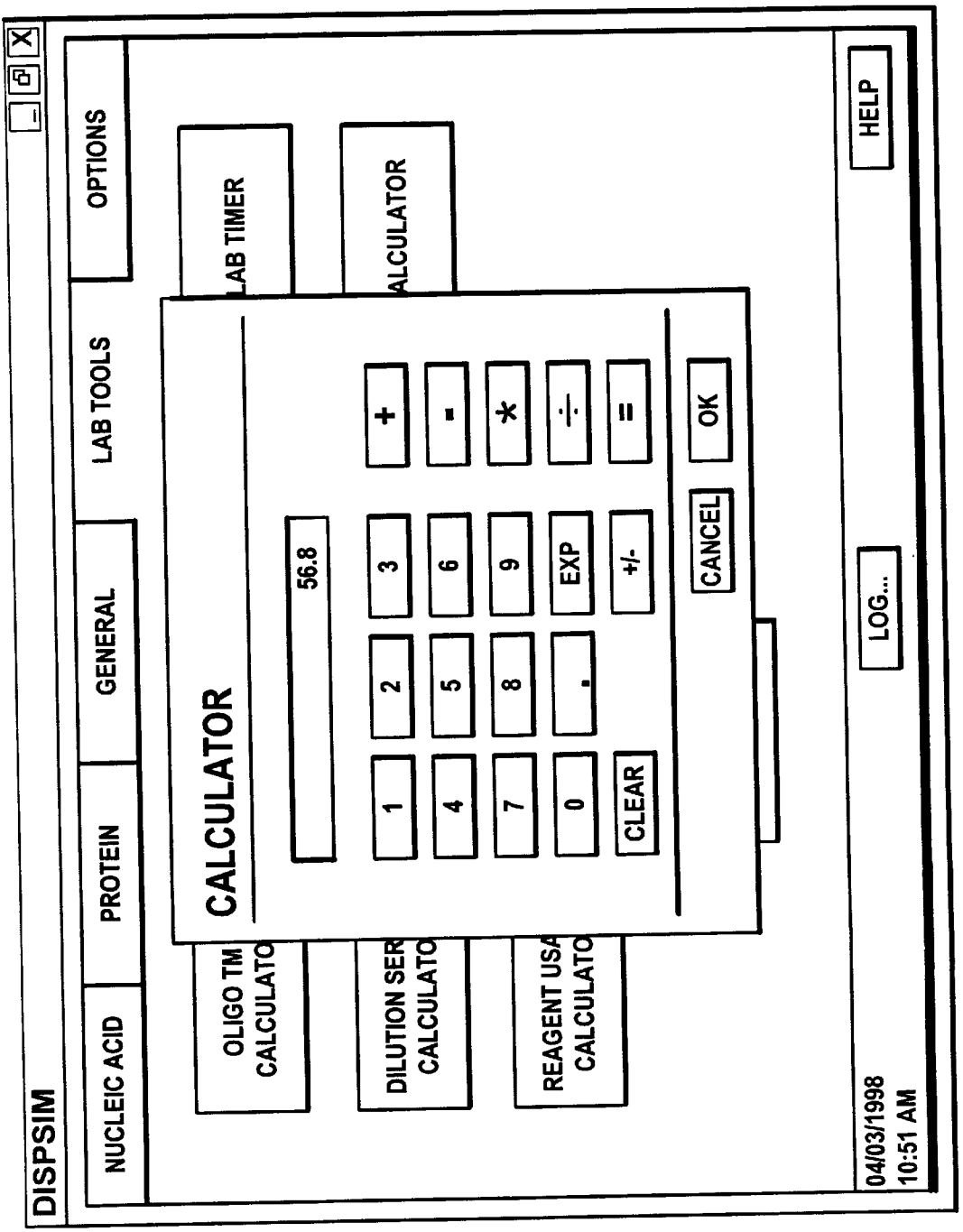

The Lab Timer utilizes the computer clock to display time and provide tone signals for Countdown (FIG. 25a), Elapsed time (FIG. 25b) and real time Alarm (FIG. 25c). The conventional Calculator (FIG. 26) provides for other calculations, and the programming may enter results into the field where the Calculator is called up.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A spectrometric instrument comprising a flashing light source for emitting a flashing source beam of light, operating means for flashing the light source, a receptacle for a light-absorbing sample receptive of the source beam to pass a transmitted beam, a dispersion element receptive of the transmitted beam to effect dispersed light therefrom, a detector receptive of the dispersed light for effecting corresponding signal data representative of the transmitted beam, and processing means receptive of the signal data for effecting corresponding spectral data representative of the transmitted beam and thereby a sample in the receptacle, the detector comprising integration means for integrating signals for an established number of flashes to effect an integrated unit of the signal data.

2. The instrument of claim 1 wherein the operating means flashes the light source for a preselected flash total number of flashes equal to a multiple of the established number, the detector is operatively connected to the operating means for effecting a corresponding multiplicity of integrated units of signal data, and the processing means comprises adding means for adding the multiplicity of units of signal data to effect the spectral data.

3. The instrument of claim 2 wherein the operating means holds the flash total constant for successive operations of the instrument with variations in the established number.

4. The instrument of claim 1 wherein, to determine the established number of flashes:

the operating means is operatively connected to the processing means, and comprises means for operating the instrument without a sample, with a selected source voltage, and with a preliminary number as the established number, so as to generate preliminary spectral data; and the processing means comprises means for ascertaining a highest peak in the preliminary spectral data and an associated preliminary peak height, and means for comparing the preliminary peak height with a preselected maximum peak height to determine an adjusted number of flashes required to effect a unit of signal data and corresponding spectral data with a corresponding peak height for the highest peak, the corresponding peak height being equal to or proximately below the maximum peak height, the adjusted number being stored for use as the established number of flashes in an integrated unit for subsequent operation of the instrument.

5. The instrument of claim 4 wherein the operating means drives the light source with a source voltage such that the light source has an intensity with a dependence on the source voltage, and further comprises means for determining an operational voltage required to effect an associated peak height at the associated spectral position, the associated peak height being equal to or adjacently below the maximum peak height, and the operational source voltage being set for driving the light source for subsequent operation of the instrument.

6. The instrument of claim 5 wherein the operational means further comprises means for operating the instrument with the adjusted number as the established number of flashes, said operating being firstly with a first source voltage so as to generate corresponding spectral data with a first peak height for the highest peak, and secondly with a second source voltage so as to generate corresponding spectral data with a second peak height for the highest peak, the highest peak being that ascertained in the preliminary spectral data and having an associated spectral position; and the processing means further comprises means for determining a functional dependence between source voltage and peak height by utilizing the first and second source voltage and the first and second peak height, and means for determining from the functional dependence an operational voltage required to effect an associated peak height at the associated spectral position, the associated peak height being equal to or adjacently below the maximum peak height, and the operational source voltage being set for driving the light source for subsequent operation of the instrument.

7. The instrument of claim 6 wherein the instrument is operated without a sample to generate the preliminary spectral data, and to generate corresponding spectral data with the first peak height and the second peak height.

8. The instrument of claim 4 wherein:

the adjusted number of flashes is determined with the processing means effecting spectral data for a full spectral range, and a narrower spectral range within the full spectral range is selected for a selected sample;

the operating means further comprises means for operating the instrument with the selected sample and with the adjusted number as the established number of flashes;

the processing means further comprises means for effecting corresponding spectral data in the narrower spectral range, means for ascertaining a highest peak in said corresponding spectral data and a corresponding preliminary peak height, and means for computing an integer ratio that approximates an actual ratio of the preselected maximum peak height to the preliminary peak height, and means for multiplying the adjusted number by the integer ratio to determine an operating number for the established number of flashes;

the operating means further comprises means for operating the instrument with the selected sample and the operating number as the established number of flashes; and the processing means further comprises means for effecting preliminary spectral data for the selected sample in the narrower spectral range with the operating number, and means for dividing the preliminary spectral data by the integer ratio to effect sample spectral data representative of the selected sample.

9. The instrument of claim 8 wherein the operating number is determined without a sample.

10. The instrument of claim 8 wherein the operating means flashes the light source for a preselected flash total number of flashes equal to a multiple of the established number, the detector is operatively connected to the operating means for effecting a corresponding multiplicity of integrated units of signal data, and the processing means comprises adding means for adding the multiplicity of units of signal data to effect the spectral data.

11. The instrument of claim 10 wherein the operating means holds the flash total constant for successive operations of the instrument with variations in the established number.

12. The instrument of claim 1 wherein the source beam comprises a plurality of spectral peaks having predetermined spectral positions, the instrument further comprises operating means for operating the instrument such that the processing means effects corresponding spectral data including measured spectral positions of the spectral peaks, and the operating means further comprises means for calibrating the measured spectral positions against the predetermined spectral positions.

13. The instrument of claim 12 wherein the instrument is operated without a sample for effecting the measured spectral positions.

14. The instrument of claim 1 wherein:

the control means further comprises means for operating the instrument repetitively with a dark sample that passes a low transmitted beam compared to the source beam so as to effect a series of integrated units of dark spectral data, the series being for a number set of a multiplicity of numbers of flashes; and the processing means further comprises means for effecting a sequence of dark spectral data over the number set for each of preselected spectral positions, means for computing a master function representative of the sequence over the number set for all of the preselected spectral positions, storing the master function, and applying the master function as a correction factor to measured spectral data to correct for non-linearity.

15. The instrument of claim 14 wherein the means for computing the master function comprises means for computing ratios of the sequenced dark spectral data to corresponding number of flashes, fitting the ratios against number of flashes to a position function for each preselected position, ascertaining a set of high points and a value for each such high point in each position function including a highest point for an associated highest position function, utilizing the high points to normalize the position functions to the highest position function so as to create a set normalized functions, and averaging the normalized functions to create the master function.

16. The instrument of claim 14 wherein the established number of flashes for an integrated unit is one.

17. The instrument of claim 1 wherein:

the instrument further comprises operating means for operating the instrument without a sample to generate open beam measured spectral data, and with a standard sample to generate standard measured spectral data, the standard sample having a high absorbance in a selected spectral range, and the spectral data being over a selected number of spectral increments in the selected spectral range; and the processing means comprises means for dividing the measured spectral data by the number of spectral increments to respectively effect open beam reduced spectral data and standard reduced spectral data, means for subtracting a stray light correction value from the reduced spectral data to respectively effect open beam corrected spectral data and standard corrected spectral data, means for computing a corrected standard absorbance from the corrected spectral data, and means for iteratively determining the stray light correction value such that the corrected standard absorbance substantially equals a pre-established standard absorbance, and means for substracting the stray light correction value from subsequently generated spectral data to correct for stray light.

18. The instrument of claim 17 wherein the means for iteratively determining comprises means for integrating and normalizing the standard reduced spectral data to effect an average, and iteratively determining a factor such that the stray light correction value is a multiplication product of the average and the factor.

19. The instrument of claim 1 further comprising a display monitor, means for displaying the spectral information on the monitor, a touch screen overlayed on the monitor, means for calculating auxiliary information derived from input of auxiliary data through the touch screen, and means for displaying the auxiliary information on the monitor, the auxiliary information being associated with the sample.

20. A spectrometric instrument comprising a light source for emitting a source beam of light, a receptacle for a light-absorbing sample receptive of the source beam to pass a transmitted beam, a dispersion element receptive of the transmitted beam to effect dispersed light therefrom, a detector receptive of the dispersed light for effecting corresponding signal data representative of the transmitted beam, and processing means receptive of the signal data for effecting corresponding spectral data representative of the transmitted beam and thereby a sample in the receptacle, the detector comprising integration means for integrating signals for an established duration to effect an integrated unit of the signal data; wherein, to determine the established duration:

an operating is operatively connected to the processing means, and comprises means for operating the instrument without a sample and with a preliminary duration of integrating signals, so as to generate preliminary spectral data; and the processing means comprises means for ascertaining a highest peak in the preliminary spectral data and an associated preliminary peak height, and means for comparing the preliminary peak height with a preselected maximum peak height to determine an adjusted duration required to effect a unit of signal data and corresponding spectral data with a corresponding peak height for the highest peak, the corresponding peak height being equal to or proximately below the maximum peak height, the adjusted duration being stored for use as the established duration for subsequent operation of the instrument.

21. The instrument of claim 20 wherein:

the adjusted duration is determined with the processing means effecting spectral data for a full spectral range, and a narrower spectral range within the full spectral range is selected for a selected sample;

the operating means further comprises means for operating the instrument with the selected sample and with the adjusted duration;

the processing means further comprises means for effecting corresponding spectral data in the narrower spectral range, means for ascertaining a highest peak in said corresponding spectral data and a corresponding preliminary peak height, and means for computing an integer ratio that approximates an actual ratio of the preselected maximum peak height to the preliminary peak height, and means for multiplying the adjusted duration by the integer ratio to determine an operating duration;

the operating means further comprises means for operating the instrument with the selected sample and the operational duration;

the processing means further comprises means for effecting preliminary spectral data for the selected sample in the narrower spectral range with the operational duration, and means for dividing the preliminary spectral data by the simple ratio to effect sample spectral data representative of the selected sample.

22. A spectrometric instrument with means for wavelength calibration, the instrument comprising a light source for emitting a source beam of light comprising a plurality of spectral peaks having predetermined spectral positions, a receptacle for a light-absorbing sample receptive of the source beam to pass a transmitted beam, a dispersion element receptive of the transmitted beam to effect dispersed light therefrom, a detector receptive of the dispersed light for effecting corresponding signal data representative of the transmitted beam, and processing means receptive of the signal data for effecting corresponding spectral data representative of the transmitted beam and thereby a sample in the receptacle, wherein the instrument further comprises operating means for operating the instrument such that the processing means effects corresponding spectral data including measured spectral positions of the spectral peaks, and the operating means further comprises means for calibrating the measured spectral positions against the predetermined spectral positions by fitting to a calibration function the ratios of the measured positions to the known positions.

23. The instrument of claim 22 wherein the instrument is operated without a sample for effecting the measured spectral positions.

24. A spectrometric instrument with means to correct for stray light, the instrument comprising a light source for emitting a source beam of light, a receptacle for a light-absorbing sample receptive of the source beam to pass a transmitted beam, a dispersion element receptive of the transmitted beam to effect dispersed light therefrom, a detector receptive of the dispersed light for effecting corresponding signal data representative of the transmitted beam, processing means receptive of the signal data for effecting corresponding spectral data representative of the transmitted beam and thereby a sample in the receptacle, and operating means for operating the instrument without a sample to generate open beam measured spectral data, and with a standard sample to generate standard measured spectral data, the standard sample having a high absorbance in a selected spectral range, the spectral data being over a selected number of spectral increments in the selected spectral range, and the processing means comprising means for dividing the measured spectral data by the number of spectral increments to respectively effect open beam reduced spectral data and standard reduced spectral data, means for subtracting a stray light correction value from the reduced spectral data to respectively effect open beam corrected spectral data and standard corrected spectral data, means for computing a corrected standard absorbance from the corrected spectral data, and means for iteratively determining the stray light correction value such that the corrected standard absorbance substantially equals a pre-established standard absorbance, and means for subtracting the stray light correction value from subsequently generated spectral data to correct for stray light.

25. The instrument of claim 24 wherein the means for iteratively determining comprises means for integrating and normalizing the standard reduced spectral data to effect an average, and iteratively determining a factor such that the stray light correction value is a multiplication product of the average and the factor.

26. An integrated spectrometric instrument comprising a spectrometer, a data processor, a display monitor, a touch screen overlayed on the monitor, and light means for effecting a light beam representative of a sample, the spectrometer being receptive of the light beam for effecting spectrometric signal data representative thereof, wherein the processor comprises means receptive of the signal data for computing corresponding spectral information representative of the light beam and thereby the sample, means for displaying the spectral information on the monitor, means for calculating auxiliary information derived from input of auxiliary data through the touch screen, and means for displaying the auxiliary information on the monitor, the auxiliary information being associated with the sample.

27. The instrument of claim 26 wherein the auxiliary information for at least one of the types of information is further derived from the spectral information.

28. The instrument of claim 27 wherein the auxiliary information for at least one of the types of information is not further derived from the spectral information.

29. The instrument of claim 26 wherein the auxiliary information for at least one of the types of information is not further derived from the spectral information.

30. The instrument of claim 26 wherein the instrument is receptive of micro-biology samples.

* * * * *